(12) United States Patent (10) Patent No.: US 8,860,726 B2
Fowler et al. (45) Date of Patent: Oct. 14, 2014

(54) TRANSFORM MANIPULATOR CONTROL

(75) Inventors: Gregory W. Fowler, Toronto (CA);
Jason Bellenger, Toronto (CA);
Hans-Frederick Brown, Montreal (CA)

(73) Assignee: Autodesk, Inc., San Rafael, CA (US)

( * ) Notice: Subject to any disclaimer, the term of this patent is extended or adjusted under 35 U.S.C. 154(b) by 523 days.

(21) Appl. No.: 13/085,195

(22) Filed: Apr. 12, 2011

(65) Prior Publication Data

US 2012/0262458 A1 Oct. 18, 2012

(51) Int. Cl.
*G06T 15/20* (2011.01)
*G06T 19/00* (2011.01)
*G06F 3/0484* (2013.01)

(52) U.S. Cl.
CPC ............ *G06F 3/04845* (2013.01); *G06T 19/00* (2013.01); *G06T 2200/24* (2013.01)
USPC ........... 345/427; 345/419; 345/156; 345/678; 715/764

(58) Field of Classification Search
USPC .................... 345/419, 427, 156, 678; 715/764
See application file for complete search history.

(56) References Cited

U.S. PATENT DOCUMENTS

| | | | |
|---|---|---|---|
| 6,720,949 B1 * | 4/2004 | Pryor et al. .................... | 345/158 |
| 7,042,440 B2 * | 5/2006 | Pryor et al. .................... | 345/158 |
| 8,232,990 B2 * | 7/2012 | King et al. .................... | 345/419 |
| 2004/0001060 A1 | 1/2004 | Stollnitz et al. | |
| 2004/0108992 A1 | 6/2004 | Rosenberg | |
| 2005/0233799 A1 | 10/2005 | LeMay et al. | |
| 2006/0132460 A1 | 6/2006 | Kolmykov-Zotov et al. | |
| 2007/0204241 A1 | 8/2007 | Glennie et al. | |
| 2007/0216713 A1 | 9/2007 | Kripac | |
| 2008/0036773 A1 | 2/2008 | Bae | |
| 2008/0165140 A1 | 7/2008 | Christie et al. | |
| 2008/0234866 A1 * | 9/2008 | Kishi et al. .................... | 700/259 |
| 2008/0250338 A1 | 10/2008 | Konar et al. | |
| 2009/0021475 A1 | 1/2009 | Steinle et al. | |
| 2010/0149211 A1 | 6/2010 | Tossing et al. | |
| 2011/0164029 A1 | 7/2011 | King et al. | |
| 2011/0296353 A1 | 12/2011 | Ahmed et al. | |

FOREIGN PATENT DOCUMENTS

WO 2010/056427 5/2010

OTHER PUBLICATIONS

Amazon Simple Queue Service, downloaded from Wikipedia, the free encyclopedia on Aug. 11, 2010. URL: http://en.wikipedia.org/wiki/Amazon_Simple_Queue_Service.
International Search Report for PCT Application No. PCT/US2012/021442 filed on Jan. 16, 2012.
International Search Report for PCT Application No. PCT/US2012/021446 filed on Jan. 16, 2012.
PCT International Search Report for International application No. PCT/US2012/033282 filed on Apr. 12, 2012.

* cited by examiner

*Primary Examiner* — Kimbinh T Nguyen
(74) *Attorney, Agent, or Firm* — Gates & Cooper LLP

(57) ABSTRACT

A method, apparatus, system, article of manufacture, and computer readable storage device provides the ability to manipulate an object in a three-dimensional (3D) modeling system. A first object is displayed and then selected in the 3D modeling system. In response to the selecting, a transform manipulator is displayed displaying coincident with the first object. The transform manipulator includes a two-dimensional (2D) control plane object and grips located on the 2D control plane object. One of the grips is activated and used to manipulate the first object.

24 Claims, 19 Drawing Sheets

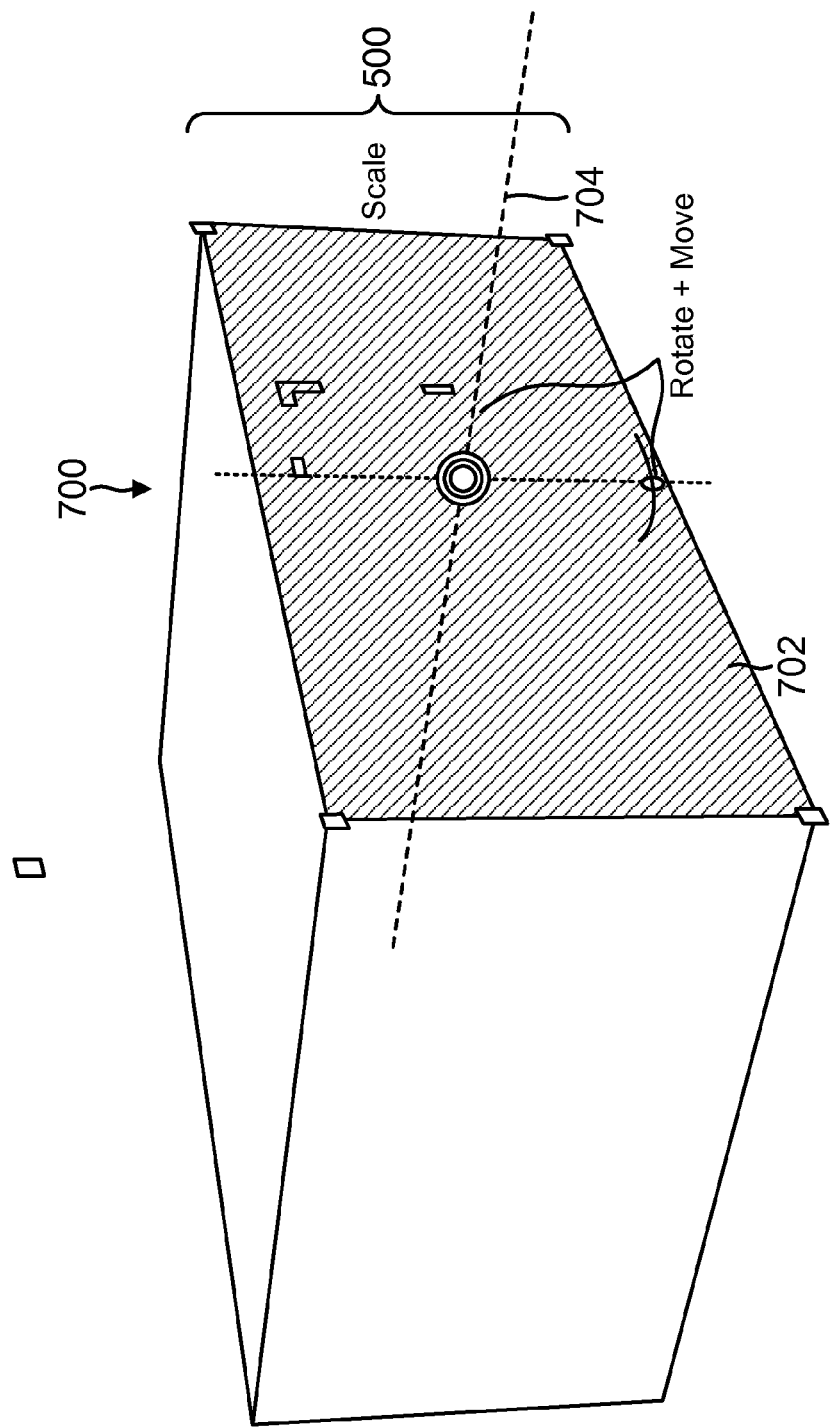

ical 3D transform paradigm that is based on an in-canvas manipulator commonly called a "transform gizmo." The different transform gizmos let users translate an object (e.g., move an object in space on a plane or on an axis), scale an object (e.g., proportionally or in an axis direction), and/or rotate an object (e.g., around one of the axis). Using a prior art transform gizmo, a user can quickly choose one or two axes when translating a selection with the mouse. A user can choose an axis by placing the mouse over any axis of the in-canvas manipulator, and then drag the mouse to translate the selection along that axis. In addition, when moving or scaling an object, users can use other areas of the gizmo to perform transforms along any two axes simultaneously. However, regardless of the manipulation performed, all actions are based off of a single fixed point on the object (either a pivot point, point of movement, point of scaling, or point of rotation).

TRANSFORM MANIPULATOR CONTROL

BACKGROUND OF THE INVENTION

1. Field of the Invention

The present invention relates generally to manipulating graphic objects, and in particular, to a method, apparatus, and article of manufacture for manipulating graphic objects in a three-dimensional (3D) modeler using a two-dimensional (2D) graphic manipulator that is placed on a control plane of an object.

2. Description of the Related Art

Navigation within 3D scenes can be difficult, often disorienting the user by failing to provide an appropriate perspective or indication of the current view. When modifying an object, the user usually has to select a plane or vector of "interaction" to modify and then use controllers (e.g., glyphs or grips) to adjust certain aspects of the object. Such controllers are often attached to the object at a particular point (referred to as a "pivot point") and provide limited editing functionality. Such prior art restrictions and limitations may be better understood with an explanation of prior art object modification in a 3D modeling environment.

Most 3D modelers have adopted a traditional 3D transform paradigm that is based on an in-canvas manipulator commonly called a "transform gizmo." The different transform gizmos let users translate an object (e.g., move an object in space on a plane or on an axis), scale an object (e.g., proportionally or in an axis direction), and/or rotate an object (e.g., around one of the axis). Using a prior art transform gizmo, a user can quickly choose one or two axes when translating a selection with the mouse. A user can choose an axis by placing the mouse over any axis of the in-canvas manipulator, and then drag the mouse to translate the selection along that axis. In addition, when moving or scaling an object, users can use other areas of the gizmo to perform transforms along any two axes simultaneously. However, regardless of the manipulation performed, all actions are based off of a single fixed point on the object (either a pivot point, point of movement, point of scaling, or point of rotation).

In certain applications, there are three separate gizmos that are each configured to perform different actions. For example, FIGS. 1A-1C illustrate three different gizmos for moving (FIG. 1A), scaling (FIG. 1B), and rotating (FIG. 1C) an object. To differentiate axis within a 2D representation of a 3D model, each axis may be assigned one of three colors: e.g., X-axis red, Y-axis green, and Z-axis blue. In other applications the different transform operations (Move/Rotate/Scale) may be merged into a unified gizmo where each handle type represents a transform operation: e.g., pyramid/triangle for move, box for scale, sphere for rotation. FIG. 1D illustrates a single unified gizmo of the prior art. However, determining the viewing perspective and editing an object once one of the gizmos of FIGS. 1A-1D is displayed in a 3D modeler (i.e., on an object) can be confusing.

As illustrated in FIGS. 1A-1D, prior art object manipulators utilize three (3) axes "kabob" style transform manipulators for move, scale, and rotate operations. Axial movement with such transform manipulators are explicit in that the user must indicate the movement by clicking/selecting a specific part of the gizmo (e.g., the square, sphere, or pyramid). Further, such gizmos may limit manipulations to those transform operations that are pivot based. Also, transform operations using such prior art transform manipulators are not made "aware" of other objects in a 3D scene. In addition to the above, the three (3) axes "kabob" style transform manipulators of FIGS. 1A-1D may have one or more of the following further shortcomings:

Unfamiliarity: While the traditional three (3) axes manipulator is fairly ubiquitous within 3D applications, its functions are quite dissimilar to the sort of manipulation paradigms that are common to 2D graphic interactions;

Graphically Dense: There is a lot of functionality clustered tightly together around a single point. Making interactions and behaviors more explicit adds to this density. Removing graphics associated with behavior descriptions makes the manipulator less discoverable.

Graphically Unsophisticated: Adding stylistic details only adds to the graphic density in addition to consuming more draw processing power on limited capacity/capability processors (e.g., mobile solutions or thin client devices such as cellular phones, personal digital assistants, tablet computers [e.g., Apple™ IPAD™, Motorola™ Xoom™, etc.], and or any other type of portable computing device).

Entirely Pivot Based: The notion of a pivot (or "reference") point is powerful however it is also unfamiliar to graphic software users. In addition, it can be time consuming to manage the pivot point when every interaction is dependent upon it. Such a pivot or reference point specifies a point where the gizmo is attached to the object.

Lack of Flow: As illustrated in FIGS. 1A-1D, separate and distinct gizmos or tools may be used to manipulate an object. The primary issue with separate tools is due to the number of times a user must switch back and forth when they are attempting to hone in on a particular shape and object placement.

In view of the above, the prior art fails to provide an easy-to-use object modification gizmo/mechanism for a 3D modeler.

SUMMARY OF THE INVENTION

Embodiments of the invention provide a 2D graphic that is used as a transform manipulator. However, rather than utilizing a restrictive manipulator that is clustered around a single object pivot point, embodiments of the invention provide a manipulator that is spread out around an object on a plane that is automatically selected based on the user's dominant view direction. Further, a single gizmo/transform manipulator is used to present most interactions that would be expected from a pivot-based triad object manipulator of the prior art but additionally supports object based transforms, implicit axial inferencing, and object matting functionality for easy position of objects with respect to each other.

Thus, embodiments of the invention provide a unique in-canvas manipulator that is closely linked to the concept of a control plane that is automatically driven by the view direction.

BRIEF DESCRIPTION OF THE DRAWINGS

Referring now to the drawings in which like reference numbers represent corresponding parts throughout:

FIGS. 7A-7D illustrate the selection of a planar face of an object and the rotation of the view space in accordance with one or more embodiments of the invention;

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

Embodiments of the invention provide a 2D planar transform manipulator that enables the user to manipulate an object in a 3D model while orienting the planar transform in an intuitive manner based on the dominant view direction/orbit.

Hardware Environment

Figure 1C:
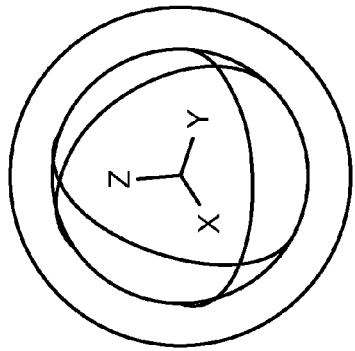
FIGS. 1A-1C illustrate three different gizmos for moving (FIG. 1A), scaling (FIG. 1B), and rotating (FIG. 1C) an object of the prior art.
Figure 1B:
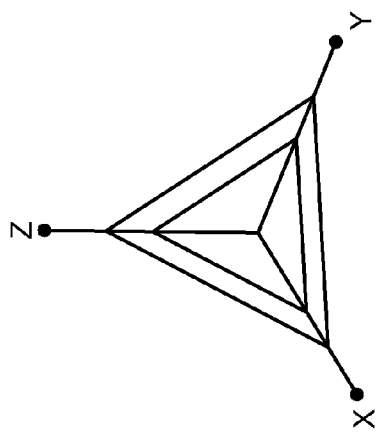
Figure 1D:
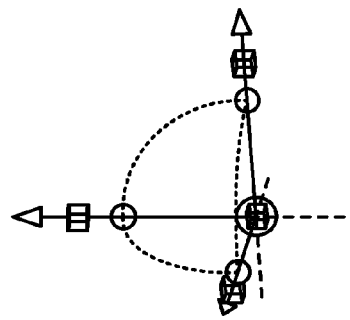
Figure 1A:
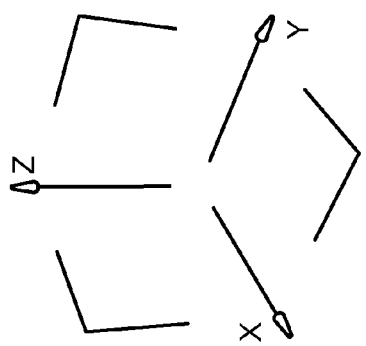
Figure 2:
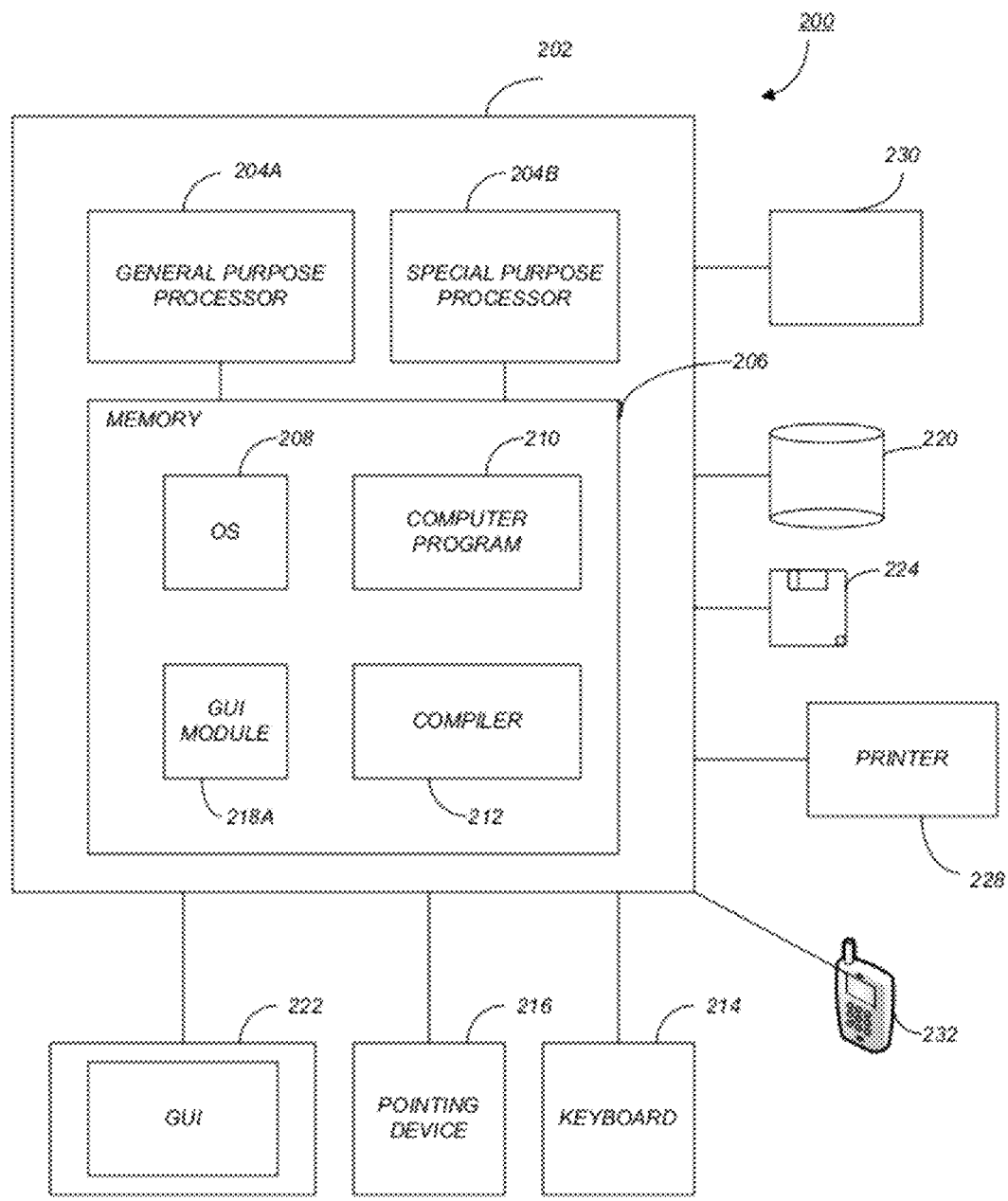
FIG. 2 is an exemplary hardware and software environment used to implement one or more embodiments of the invention.

FIG. 2 is an exemplary hardware and software environment 200 used to implement one or more embodiments of the invention. The hardware and software environment includes a computer 202 and may include peripherals. Computer 202 may be a user/client computer, server computer, or may be a database computer. The computer 202 comprises a general purpose hardware processor 204A and/or a special purpose hardware processor 204B (hereinafter alternatively collectively referred to as processor 204) and a memory 206, such as random access memory (RAM). The computer 202 may be coupled to other devices, including input/output (I/O) devices such as a keyboard 214, a cursor control device 216 (e.g., a mouse, a pointing device, pen and tablet, etc.) and a printer 228. In one or more embodiments, computer 202 may be a thin client device or may be coupled to a thin client device 232 (e.g., an MP3 player, iPod™, Nook™, portable digital video player, cellular device, personal digital assistant, tablet computer, IPAD™, Xoom™, etc.).

In one embodiment, the computer 202 operates by the general purpose processor 204A performing instructions defined by the computer program 210 under control of an operating system 208. The computer program 210 and/or the operating system 208 may be stored in the memory 206 and may interface with the user and/or other devices to accept input and commands and, based on such input and commands and the instructions defined by the computer program 210 and operating system 208 to provide output and results.

Output/results may be presented on the display 222 or provided to another device for presentation or further processing or action. In one embodiment, the display 222 comprises a liquid crystal display (LCD) having a plurality of separately addressable liquid crystals. Each liquid crystal of the display 222 changes to an opaque or translucent state to form a part of the image on the display in response to the data or information generated by the processor 204 from the application of the instructions of the computer program 210 and/or operating system 208 to the input and commands. The image may be provided through a graphical user interface (GUI) module 218A. Although the GUI module 218A is depicted as a separate module, the instructions performing the GUI functions can be resident or distributed in the operating system 208, the computer program 210, or implemented with special purpose memory and processors.

Some or all of the operations performed by the computer 202 according to the computer program 210 instructions may be implemented in a special purpose processor 204B. In this embodiment, the some or all of the computer program 210 instructions may be implemented via firmware instructions stored in a read only memory (ROM), a programmable read only memory (PROM) or flash memory within the special purpose processor 204B or in memory 206. The special purpose processor 204B may also be hardwired through circuit design to perform some or all of the operations to implement the present invention. Further, the special purpose processor 204B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 202 may also implement a compiler 212 which allows an application program 210 written in a programming language such as COBOL, Pascal, C++, FORTRAN, or other language to be translated into processor 204 readable code. After completion, the application or computer program 210 accesses and manipulates data accepted from I/O devices and stored in the memory 206 of the computer 202 using the relationships and logic that was generated using the compiler 212.

The computer 202 also optionally comprises an external communication device such as a modem, satellite link, Ethernet card, or other device for accepting input from and providing output to other computers 202.

In one embodiment, instructions implementing the operating system 208, the computer program 210, and the compiler 212 are tangibly embodied in a computer-readable medium, e.g., data storage device 220, which could include one or more fixed or removable data storage devices, such as a zip drive, floppy disc drive 224, hard drive, CD-ROM drive, tape drive, etc. Further, the operating system 208 and the computer program 210 are comprised of computer program instructions which, when accessed, read and executed by the computer 202, causes the computer 202 to perform the steps necessary to implement and/or use the present invention or to load the program of instructions into a memory, thus creating a special purpose data structure causing the computer to operate as a specially programmed computer executing the method steps described herein. Computer program 210 and/or operating instructions may also be tangibly embodied in memory 206 and/or data communications devices 230, thereby making a computer program product or article of manufacture according to the invention. As such, the terms "article of manufacture," "program storage device" and "computer program product" as used herein are intended to encompass a computer program accessible from any computer readable device or media.

Of course, those skilled in the art will recognize that any combination of the above components, or any number of different components, peripherals, and other devices, may be used with the computer 202.

Although the term "user computer" or "client computer" is referred to herein, it is understood that a user computer 202 may include portable devices such as cell phones, notebook computers, pocket computers, or any other device with suitable processing, communication, and input/output capability.

Figure 3:
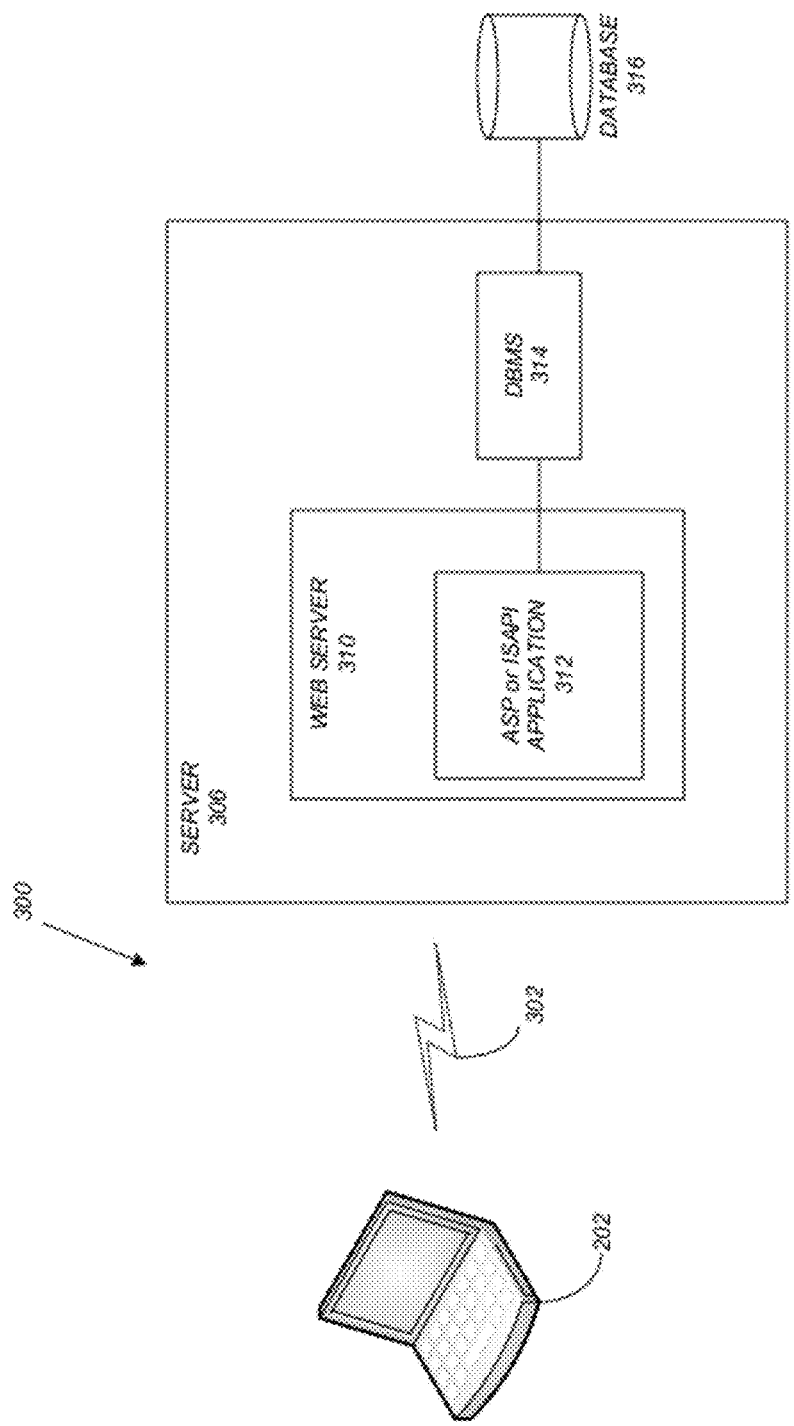
FIG. 3 schematically illustrates a typical distributed computer system using a network to connect client computers to server computers in accordance with one or more embodiments of the invention.

FIG. 3 schematically illustrates a typical distributed computer system 300 using a network 302 to connect client computers 202 to server computers 306. A typical combination of resources may include a network 302 comprising the Internet, LANs (local area networks), WANs (wide area networks), SNA (systems network architecture) networks, or the like, clients 202 that are personal computers or workstations, and servers 306 that are personal computers, workstations, minicomputers, or mainframes (as set forth in FIG. 2).

A network 302 such as the Internet connects clients 202 to server computers 306. Network 302 may utilize ethernet, coaxial cable, wireless communications, radio frequency (RF), etc. to connect and provide the communication between clients 202 and servers 306. Clients 202 may execute a client application or web browser and communicate with server computers 306 executing web servers 310. Such a web browser is typically a program such as MICROSOFT INTERNET EXPLORER™, MOZILLA FIREFOX™, OPERA™, APPLE SAFARI™, etc. Further, the software executing on clients 202 may be downloaded from server computer 306 to client computers 202 and installed as a plug in or ACTIVEX™ control of a web browser. Accordingly, clients 202 may utilize ACTIVEX™ components/component object model (COM) or distributed COM (DCOM) components to provide a user interface on a display of client 202. The web server 310 is typically a program such as MICROSOFT'S INTERNET INFORMATION SERVER™.

Web server 310 may host an Active Server Page (ASP) or Internet Server Application Programming Interface (ISAPI) application 312, which may be executing scripts. The scripts invoke objects that execute business logic (referred to as business objects). The business objects then manipulate data in database 316 through a database management system (DBMS) 314. Alternatively, database 316 may be part of or connected directly to client 202 instead of communicating/obtaining the information from database 316 across network 302. When a developer encapsulates the business functionality into objects, the system may be referred to as a component object model (COM) system. Accordingly, the scripts executing on web server 310 (and/or application 312) invoke COM objects that implement the business logic. Further, server 306 may utilize MICROSOFT'S™ Transaction Server (MTS) to access required data stored in database 316 via an interface such as ADO (Active Data Objects), OLE DB (Object Linking and Embedding DataBase), or ODBC (Open DataBase Connectivity).

Generally, these components 308-318 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the term "user computer", "client computer", and/or "server computer" is referred to herein, it is understood that such computers 202 and 306 may include portable devices such as cell phones, notebook computers, pocket computers, or any other device with suitable processing, communication, and input/output capability.

Of course, those skilled in the art will recognize that any combination of the above components, or any number of different components, peripherals, and other devices, may be used with computers 202 and 306.

Software Embodiments

Embodiments of the invention are implemented as a software application on a client 202 or server computer 306. The software application may implement a 3D modeling application in which objects may be graphically manipulated by a user via a cursor control device. In one or more embodiments of the invention, a transform manipulator control (referred to herein as a "faultless gizmo" or "manipulator") provides the ability to manipulate/edit an object in a unique manner.

The transform concept of embodiments of the invention is based around the idea of a 2D transform manipulation graphic that is placed on a "control plane" that intersects with the center of the selected object(s). Such a premise serves to provide the user access to a number of transformation tools, most of which are constrained to the control plane. Use of the transform manipulator on a control plane as described herein gives the user quick access to manipulation along two (2) axes.

Constraining most interactions to a plane is based on a concept that users generally do not wish to manipulate an object at an angle that is acute to the camera view (e.g., move the object directly towards or away from the camera) as it does not provide enough visual feedback to understand the consequences of the operation.

Embodiments of the invention resolves such issues (as descried herein) in one or more of the following ways:
1. The manipulator paradigm is more strongly based on graphic manipulation interactions;
2. The functionality is not clustered around a single point but rather spread out around the object;
3. The manipulator is a 2D graphic as opposed to 3D geometry allowing for more interesting graphic approaches;
4. The manipulator uses both pivot based as well as object based transforms; and
5. All functionality is present in a single manipulator.

Control Plane

The transform manipulator provides a 3D transform manipulation graphic that is placed on a "control plane." The initial issue is to determine which plane to use as a control plane. Embodiments of the invention programmatically and automatically (i.e., without additional user input) establishes the control plane based on the active view direction. Thus, the plane or vector of "interaction" is automatically selected based on the users dominant view direction, thereby eliminating the step of the user manually selecting a plane or vector of interaction. Such an automatic selection enables a more intuitive use of the transform manipulator.

Figure 4A:
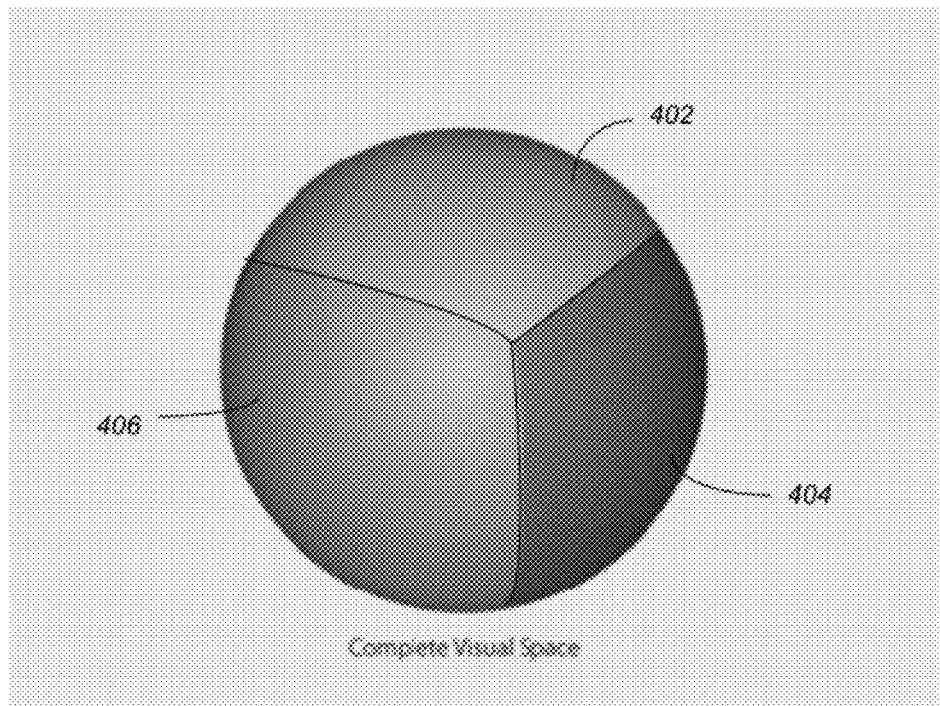
FIG. 4A illustrates a sphere that represents the complete visual space used to determine the control plane in accordance with one or more embodiments of the invention.
Figure 4B:
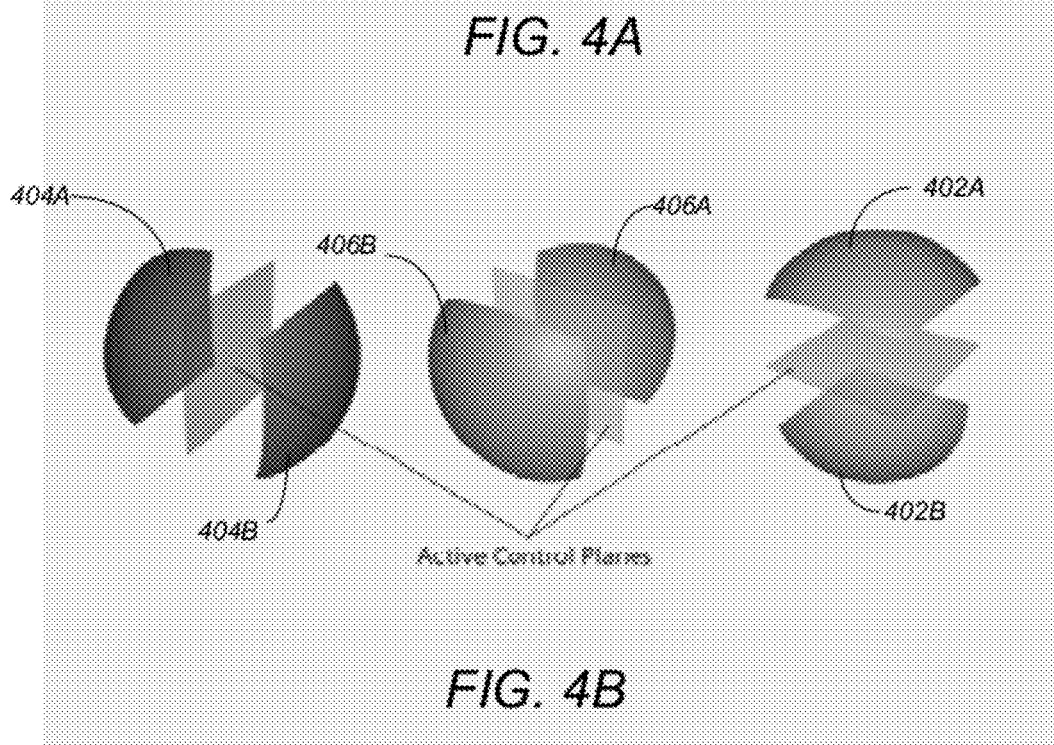
FIG. 4B illustrates the active control planes that correspond to each area of the sphere in accordance with one or more embodiments of the invention.

The control plane may be system controlled (no explicit user facing controls). Which control plane appears is view dependant. FIG. 4A illustrates a sphere that represents the complete visual space used to determine the control plane in accordance with one or more embodiments of the invention. Different areas 402-406 of the sphere may be used to determine the current view of the modeling space. The sphere may rotate with the modeling space. Depending on the area 402-406 that is most present in the user's view, a particular control plane may be selected. FIG. 4B illustrates the active control planes that correspond to each area of the sphere in accordance with one or more embodiments of the invention. As illustrated, the modeling space may be viewed as a sphere divided into six equal regions 402A, 402B, 404A, 404B, 406A, and 406B. The system determines which control plane is active based on which region 402-406 the viewpoint is looking from.

The spheres of FIGS. 4A and 4B may not be visible to the user but are used to determine the active control plane by the system without user input. Instead, the user may view the control plane that contains the transform manipulator. Accordingly, once a view direction/perspective has been established, the system identifies an active control plane.

As an example, if the user elects to move the camera angle of a model to view an object from the side instead of the front, the sphere representing the visual space will rotate as well. In this regard, certain viewing angles may be preferable for performing object modifications. The user can rotate the visual space of the model to select such an optimal view for modifying an object. For example, if the user is attempting to move an object on the z-axis, a top-down view from above is not preferred because it is difficult to view the depth and to predict how much the object is being moved. Similarly, to perform an object translation/transformation along the x-y plane, a top-down view would be preferred. Once the view space has been rotated (e.g., if the user orbits in the view space to a different camera/view position), the system will examine the area 402-406 that is the most visible and select the active control plane based thereon.

Transform Manipulator

Figure 5:
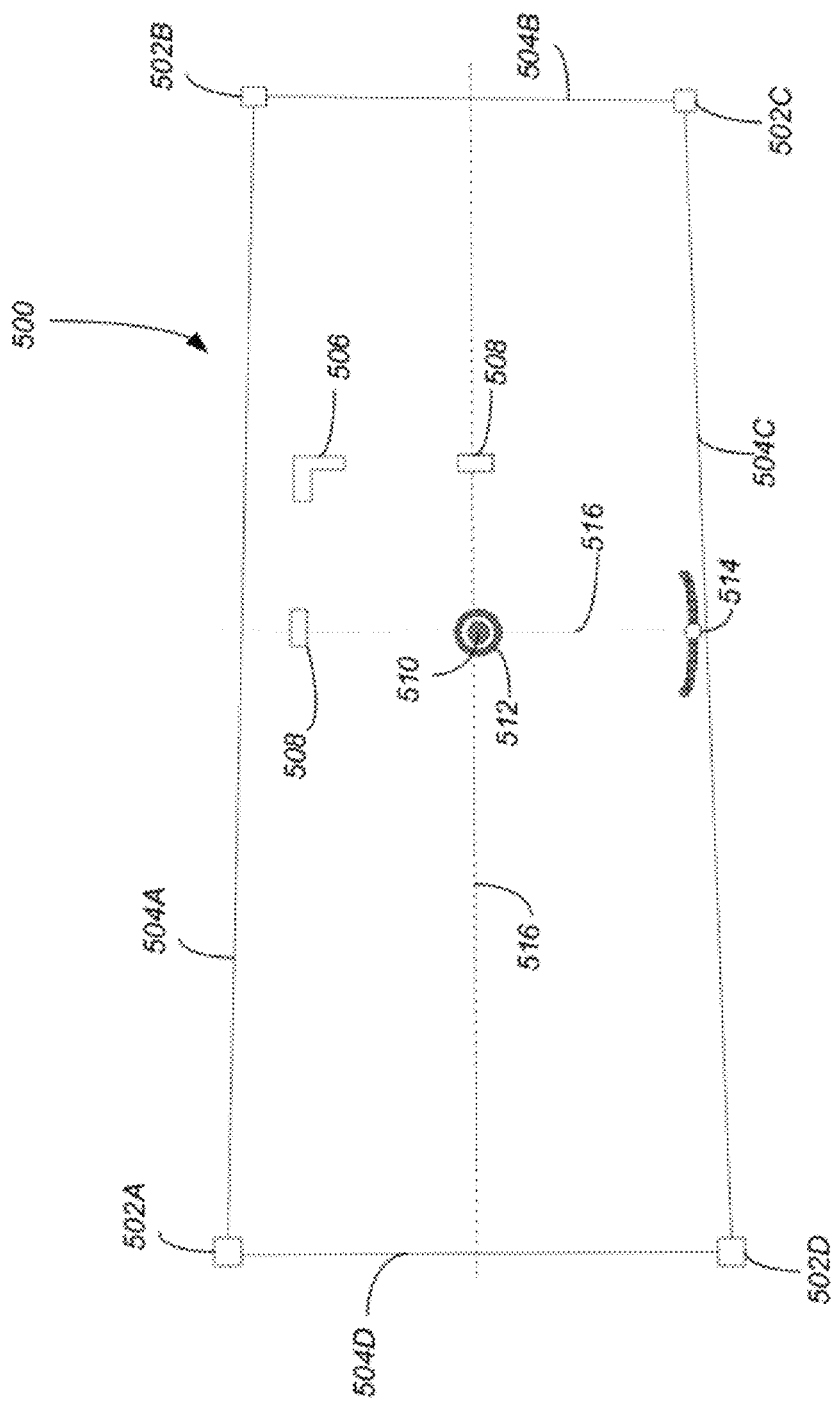
FIG. 5 illustrates the anatomy of the transform manipulator/faultless gizmo in accordance with one or more embodiments of the invention.

FIG. 5 illustrates the anatomy of the transform manipulator/faultless gizmo in accordance with one or more embodiments of the invention. The transform manipulator 500 is overlayed on or displayed coincident with an object (not shown in FIG. 5) once a particular attribute of a model is selected (e.g., upon the selection of a face, edge, vertex, or object). Each glyph/grip on the manipulator 500 provides the ability for the user to manipulate the object (with which it is associated) in a different manner.

Squares 502A-502D may be used for non-proportional scaling. Moving a square 502 scales the object in two axes. The scale is based on the bounding box in that the scale is anchored at the opposite corner point to the corner being moved. Thus, if the user is moving square 502A, the object is scaled while the bounding box is anchored to square 502C.

Moving any of the lines 504A-504D of the bounding box also enables the user to perform non-proportional scaling. Moving a line 504A-504D scales in one (1) axis. The scale is based on the bounding box in that the scale is anchored at the opposite line to the line being moved (e.g., when scaling using line 504A, the scale is anchored to line 504C).

Moving the L-shaped manipulator 506 enables the user to perform a proportional scale such that the object is scaled equally in three (3) axes. Proportional scaling using L-shaped manipulator 506 is pivot based in that the scale is anchored at a pivot/reference point.

Moving the short line 508 enables the user to perform a non-proportional scale in one (1) axis. The scale is anchored at the pivot/reference point.

Points 510 and 512 are pivot/reference points. Moving point 510 provides for a snap move operation where the object is moved with snap (e.g., to a grid, to other objects, to alignment boxes, to shape extensions, to guides, to shape intersections, to shape handles, to shape vertices, to connection points, etc.). Point 512 is the pivot point itself. Moving point 512 moves the pivot point with snap turned on (e.g., to various reference snap locations per the above examples). Once the pivot point 512 is moved, any operations that rely on the pivot point 512 will use the new location of the pivot point 512. For example, a rotation or scale may be performed around the pivot point 512.

Grip 514 is a rotate grip that enables the user to rotate the object around an axis 516 that runs perpendicular to the plane that intersects the pivot point 512.

Thus, the transform manipulator 500 consists of various grips and graphical interface components 502-516 that enable the user to modify an object. As described above, the manipulator 500 may be partially transparent or displayed in a manner that does not obscure the user's view.

Figure 6:
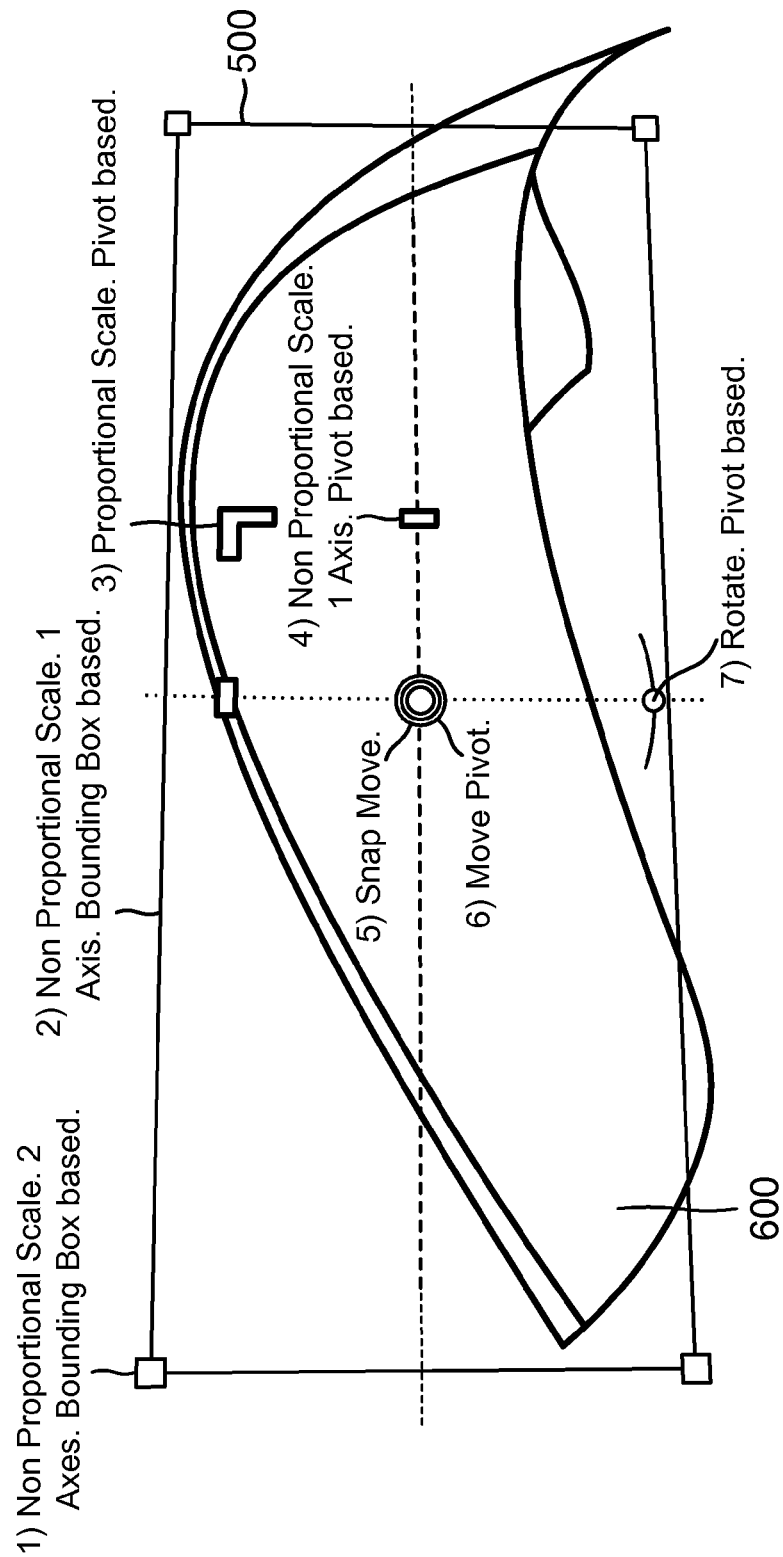
FIG. 6 illustrates a manipulator displayed coincident with an object that has been selected in accordance with one or more embodiments of the invention.

FIG. 6 illustrates the manipulator 500 displayed coincident with an object 600 that has been selected in accordance with one or more embodiments of the invention.

The placement and manifestation of the transform manipulator/faultless gizmo is based on both the active control plane and the bounding box of the selected object. In this regard, the transform manipulator may utilize the bounding box of the object that the gizmo is controlling and adds another ten-twenty percent (10-20%) of buffer space. Thus, as illustrated in FIG. 6, the gizmo 500 may be constructed of a bounding box for object 600 plus suffer buffer space to allow additional space for manipulating the object.

The manipulator 500 may be displayed when the user selects an object, or a face, vertex, or plane of an object. Depending on what part of an object is selected, certain aspects of the manipulator 500 may/may not be displayed to a user. For example, if an operation utilizes a pivot operation, the pivot point 512 will be displayed. However, if a pivot operation is not being performed, the pivot point 512 may not be displayed. Similarly, once a glyph has been activated, a different icon may be displayed (e.g., as the cursor) that indicates what operation is being performed (e.g., an icon representative of a scale operation may be displayed as the cursor). In another embodiment, if a square scale 502 operation is activated, other glyphs on the manipulator 500 may be displayed. In yet another embodiment, if the user is moving an object along an axis 516, an additional glyph may be displayed indicating which axis (e.g., x, y, or z) direction the object is being transformed/translated on. Thus, different operations may be enabled once a control plane/transform manipulator 500 is activated. Each glyph 512-516 of the manipulator 500 has a specific icon representation that is displayed once the glyph has been activated or during a rollover/hover of the cursor over the glyph.

As described above, the control plane may be based on the view direction. However, the selection of certain properties in a model may override such a view direction dependent control plane. For example, if a planar surface of an object is selected, the system may not use the view direction but instead may use the direction of the selected face (in combination with the view direction) to display the control plane. In this regard, the control plane may be placed on the selected planar face itself. In one or more embodiments, if a planar surface (e.g., a planar face of an object) is selected, scale functions of the manipulator 500 are separated from the rotate and move functions. When scaling a planar surface, the scale operation may always take place in the same plane as the planar face itself. However, rotate and move functions are likely associated with the control plane.

FIG. 7A illustrates the selection of a planar face 702 of an object 700 in accordance with one or more embodiments of the invention. As illustrated, face 702 of object 700 has been selected and the manipulator 500 is overlayed/displayed coincident with object 700 (i.e., on the planar face). The scale functions of the manipulator 500 are located on the same plane as the face 702. The rotation and move functions are performed in x-z coordinate space as indicated by the display of the dashed line on the z-axis 704 through the center/pivot point. Further, once the planar face 702 has been selected, the control plane may then be restricted to the selected planar face 702. Thus, while the angle/view at which the control plane (and transform manipulator 500) is displayed may change, operations performed using the transform manipulator are performed with respect to the selected planar face 702.

Figure 7B:
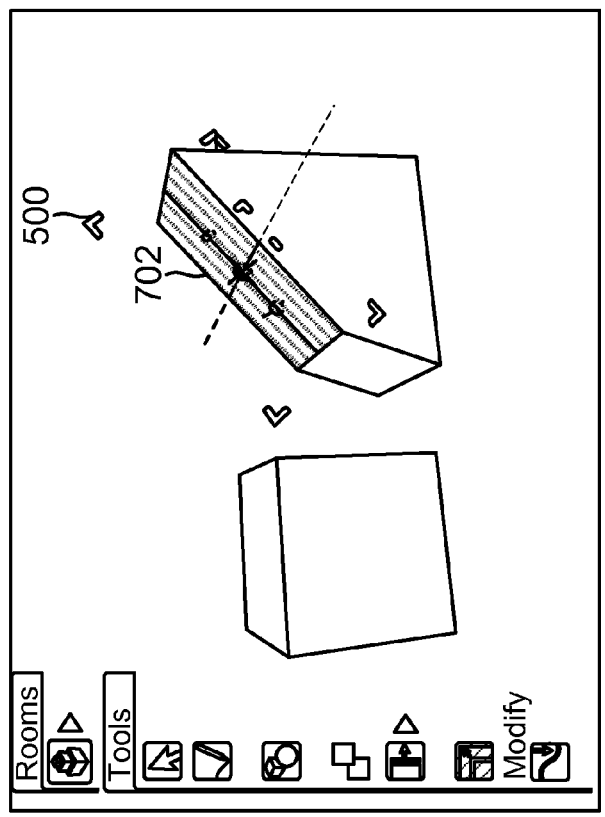
Figure 7B:
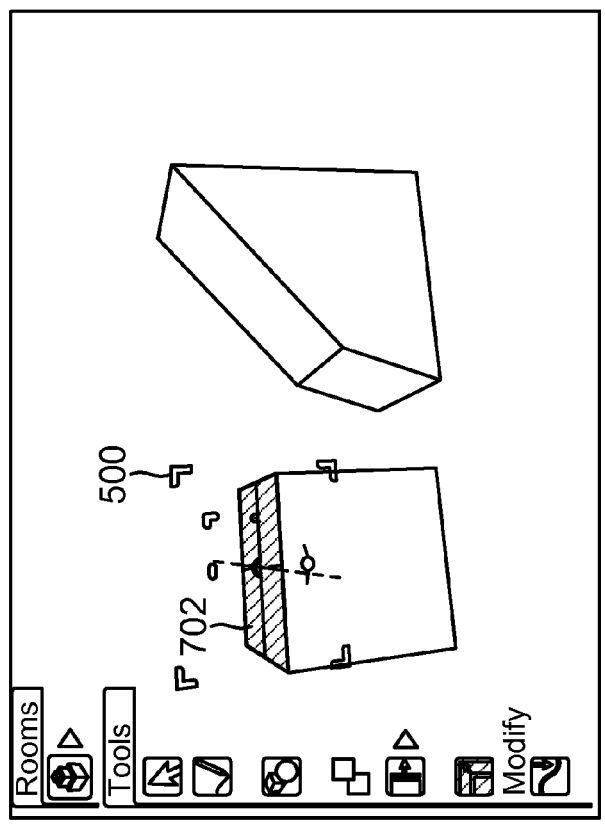
Figure 7C:
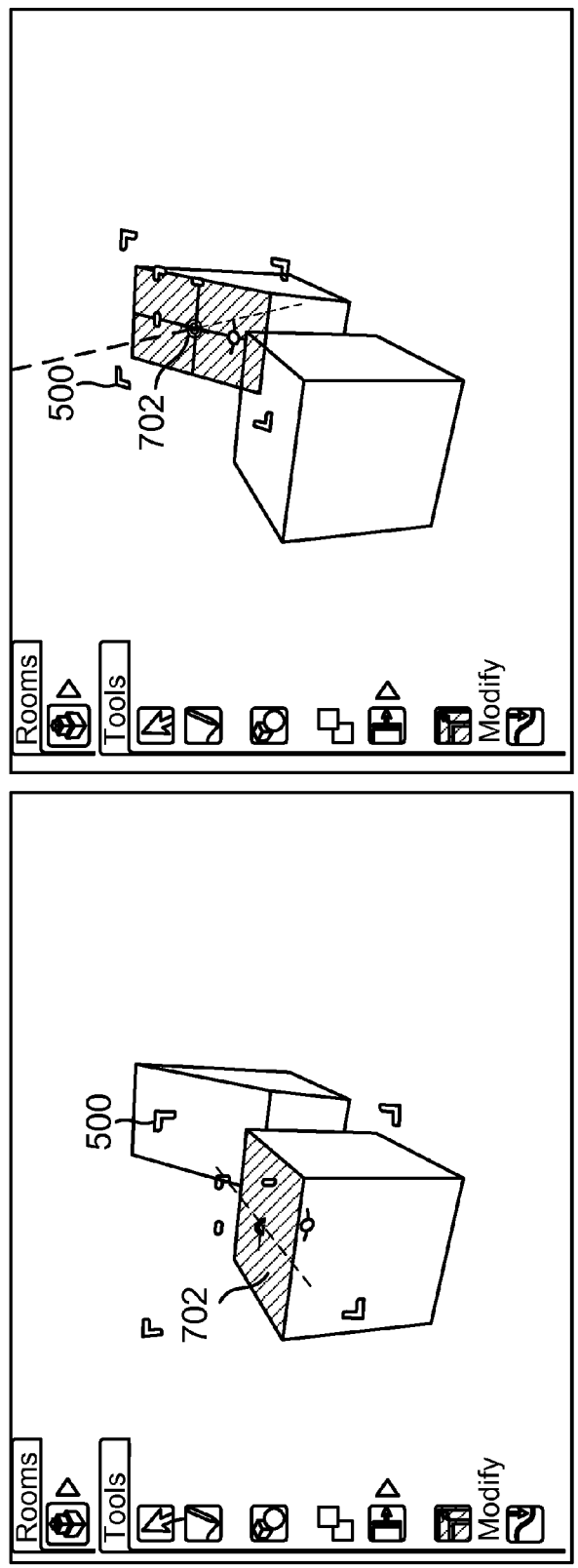
Figure 7D:
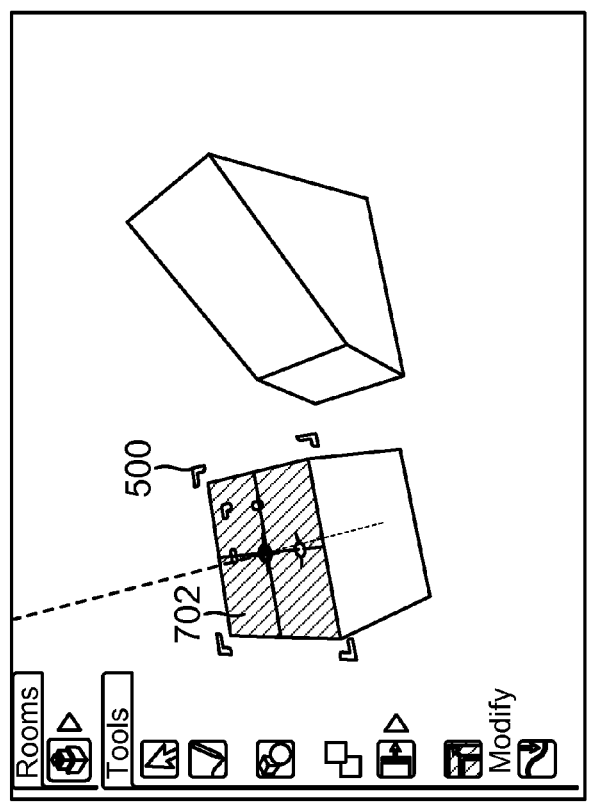
Figure 7D:
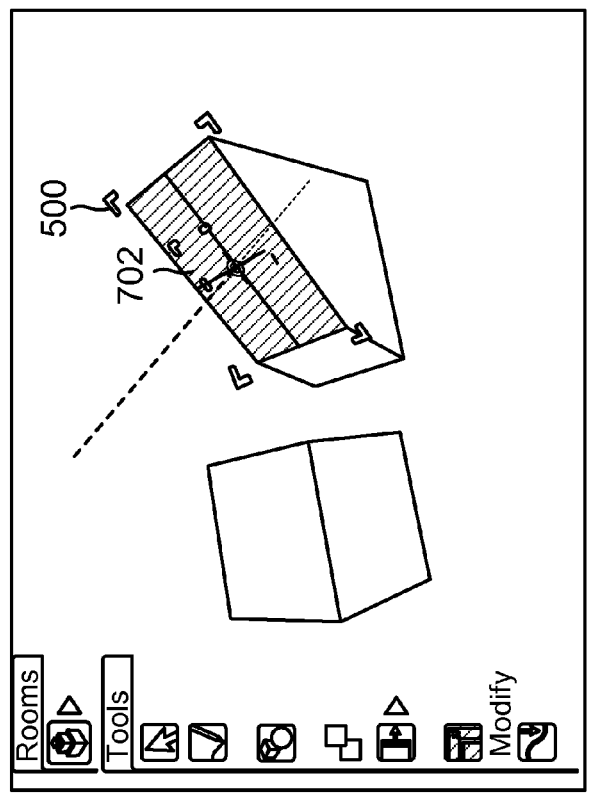

For example, if the user orbits the viewing angle (e.g., rotates the camera view), the control plane and transform manipulator 500 may rotate to a different local coordinate space. FIGS. 7B-7D illustrate the rotation/change in the viewing angle and a corresponding change in the local coordinate space used by the transform manipulator 500 in accordance with one or more embodiments of the invention. In FIG. 7B, the transform manipulator 500 is displayed on the x-z plane and is coplanar with the selected planar face 702. However, if the view is rotated, the transform manipulator may rotate to the y-z plane (FIG. 7C) or x-y plane (FIG. 7D) (i.e., such that it is no longer coplanar with planar face 502) while the planar face 702 remains selected. In other words, the transform manipulator 500 will rotate to allow the user to perform manipulations of the selected planar face 702 on different local coordinate systems. The control plane that the transform manipulator 500 is displayed on continues to be based on the view space (i.e., from the user's perspective), while restricting manipulations to the selected planar face 702.

Such a restriction of the transform manipulator 500 to the selected planar face 702 upon the selection of the planar face 702 may be distinguished from selecting the object in other ways (e.g., selection of the object's vertex, edge, or object selection glyph) after which the rotation/orbit of the view would rotate the transform manipulator 500 in the world coordinate space of the object 700 in a manner that makes the most sense to the user (i.e., based on the view as described above).

Axial Implicit Inferencing

Figure 8:
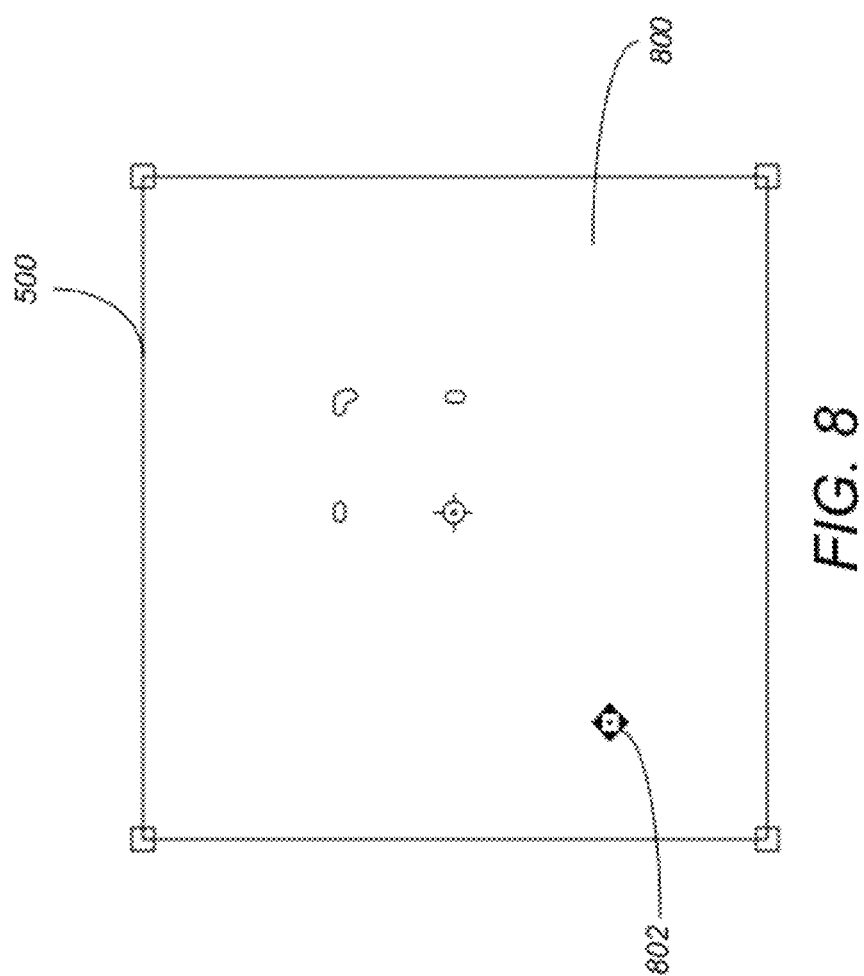
FIG. 8 illustrates a manipulator displayed on a face/surface while the user is moving cursor in accordance with one or more embodiments of the invention.

In one or more embodiments of the invention, the transform operation provides the ability to automatically select an axis that can be used to restrict the transform operation. FIG. 8 illustrates the manipulator 500 displayed on a face/surface 800 while the user is moving cursor 802.

Figure 9A:
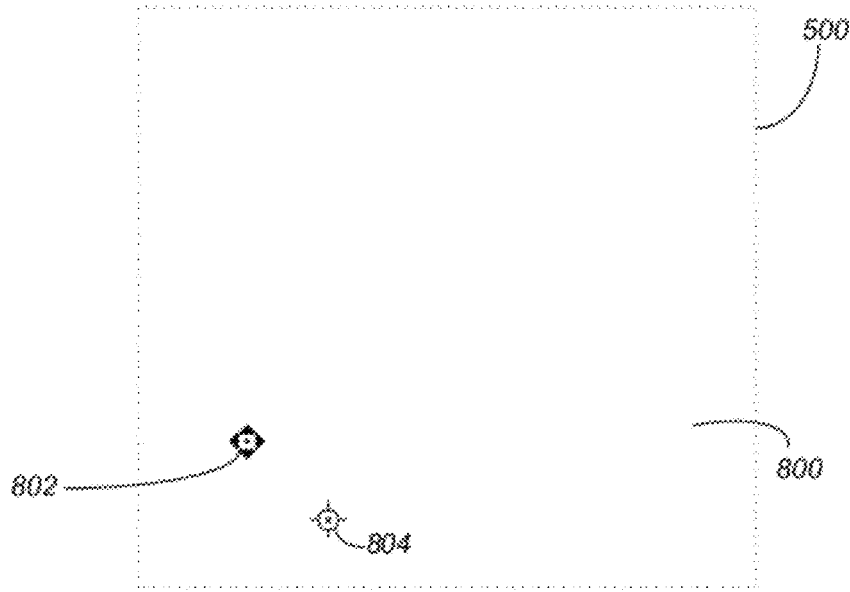
FIG. 9A illustrates the manipulator displayed on face/surface once a move operation has been activated in accordance with one or more embodiments of the invention.

FIG. 9A illustrates the manipulator displayed on face/surface 800 once a move operation has been activated. The user presses down to engage a move operation at which point the dot in the middle of cursor 802 may change to a different color (e.g., pink). In addition, once activated, all other modification glyphs may disappear for the duration of the operation. During a "free" move operation, a start point graphic (e.g., a small point or circle) 804 may be displayed in addition to the move cursor 802 with the colored dot. The start point indicates where the move operation began so that the user can determine the transform/translate/move distance.

Figure 9B:
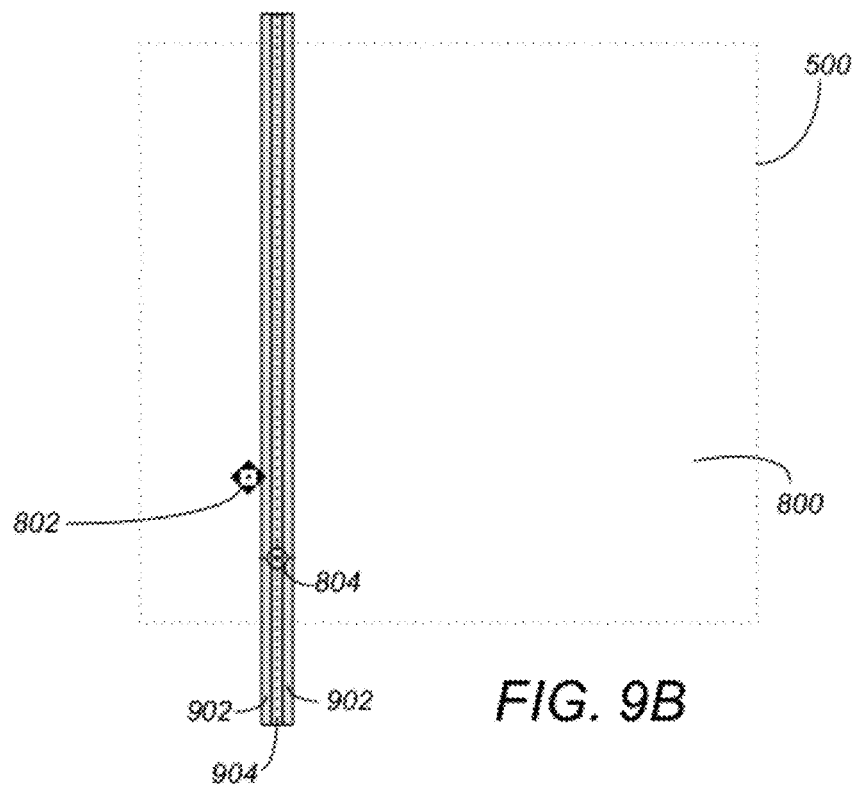
FIG. 9B illustrates the entry of a region and a resulting display of a dashed line in accordance with one or more embodiments of the invention.

When the user's cursor 802 enters a region (e.g., within fifteen [15] pixels of the Y-axis, on either side; thirty [30] pixel region width total), a Y-axis dashed line may be invoked visually. However, no changes to the behavior of the user's cursor may result. FIG. 9B illustrates the entry of such a region 902 and a resulting display of a dashed line 904 in accordance with one or more embodiments of the invention. Note that such regions are only displayed in the figures for purposes of illustration and are not actually displayed to the user.

Figure 9C:
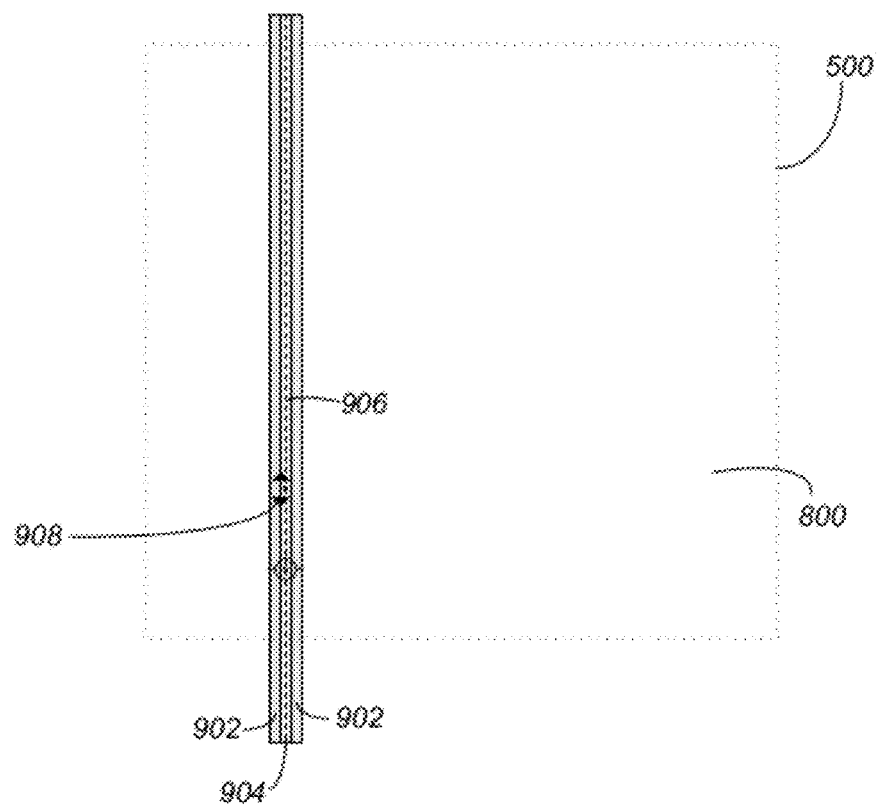
FIG. 9C illustrates the use of an axis constrained move cursor operation in accordance with one or more embodiments of the invention.

As illustrated in FIG. 9C, when the user's cursor 802 enters the middle region 906 (e.g., within five [5] pixels of the Y-axis, on either side: ten [10] pixel region width total), the cursor 802 may switch to the "axis constrained move cursor" 908 (also referred to as dragging mode). The "axis-constrained move cursor" 908 may have a different color move point (e.g., green) than before (e.g., pink), and the point of the cursor 908 may snap to the Y-axis 904. The cursor 908 may not change position/snap. As long as the cursor remains in the middle region 906, the move point (one more operation) remains snapped to the axis 904.

In addition to the two axes that belong to the dominant plane, the user may also be able to move perpendicular to the control plane along a single axis. Similar to that displayed in FIGS. 8 and 9, using the manipulator, the user can enter the transform/move/translate mode at which point the move cursor 802 appears. The user can begin a free move and the start point 804 (along with a perpendicular axis) may be displayed. When the user moves into the outside regions 902, a full axis (e.g., similar to dashed line 906) may be displayed coincident with the perpendicular axis. Further, when the user enters the middle region 904, the cursor 802 may change (e.g., into cursor 908) and the move point and operation may snap to the perpendicular axis. If the outside regions 902 and middle region 904 for two axes coincide, the perpendicular axis may take precedence for controlling cursor movement.

Object Mating

Embodiments of the invention may also use the control plane as a bounding box snap mechanism to mate objects together. This behavior assists with the positioning of objects with respect to each other. Further, such object mating as described herein may also be utilized with internal planes of an object.

The general idea is to detect when the control plane is touching another bounding box from a scene object, then move that controlled object inside the plane itself (so the object is not centered in the plane anymore). This condition is maintained as the user is dragging until the control plane itself touches the other side of the controlled object, at which time the system repositions the controlled object in the center of the plane thus relaxing the mating behavior.

Figure 10A:
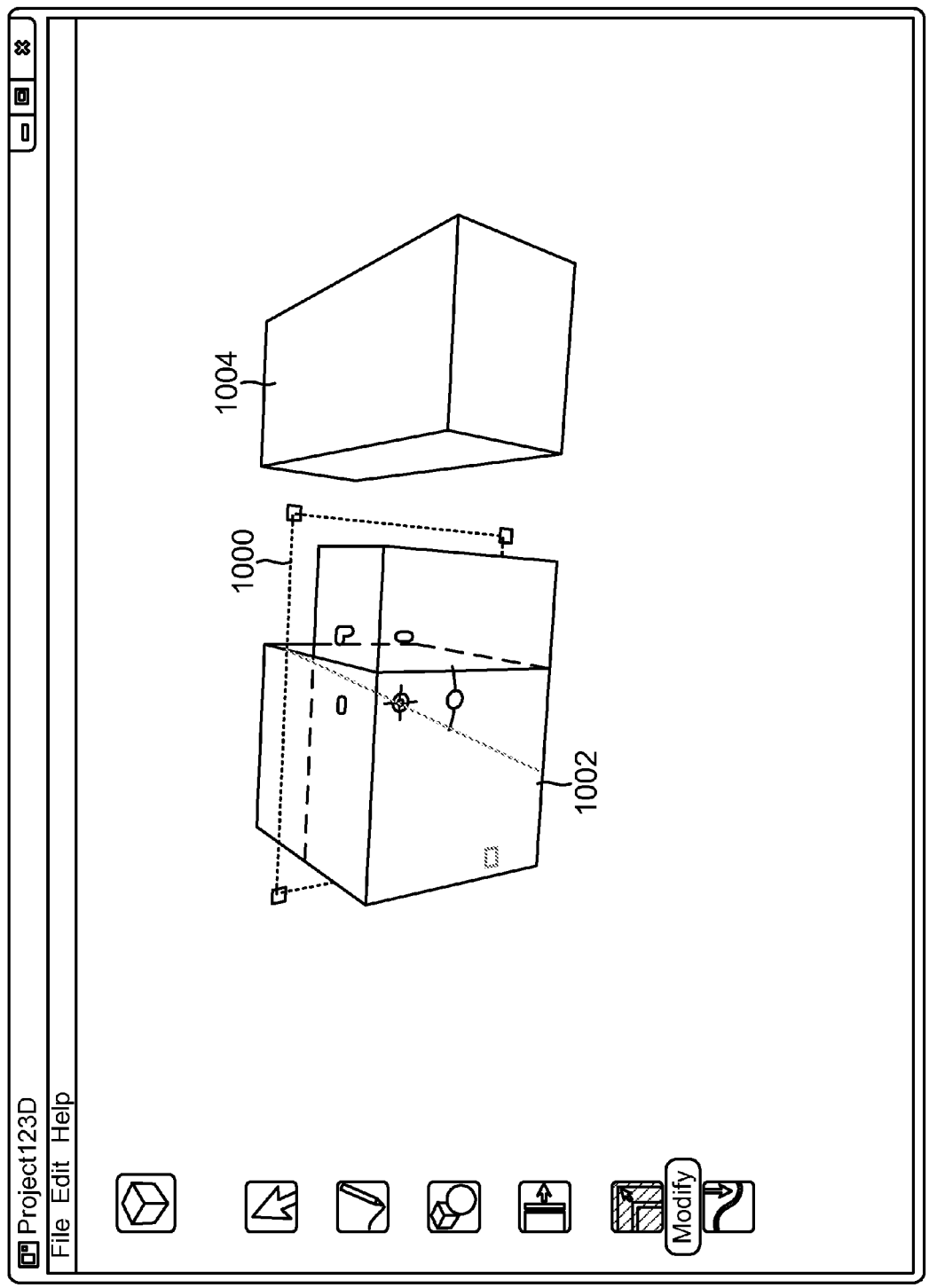
FIGS. 10A-10E illustrate the performance of object mating in accordance with one or more embodiments of the invention.

FIGS. 10A-10E illustrate the performance of object mating in accordance with one or more embodiments of the invention. FIG. 10A illustrates the starting point of the interaction flow where the user has initiated a translation operation. As illustrated, the transform manipulator 1000 is displayed on a control plane that intersects the middle of object 1002. Further, the transform manipulator 1000 provides a bounding box that is slightly larger (e.g., 10-20% larger) than the object 1002 that the manipulator 1000 is controlling. The user is performing a translation operation moving object 1002 towards object 1004 using manipulator 1000 (i.e., using cursor 1006).

Figure 10B:
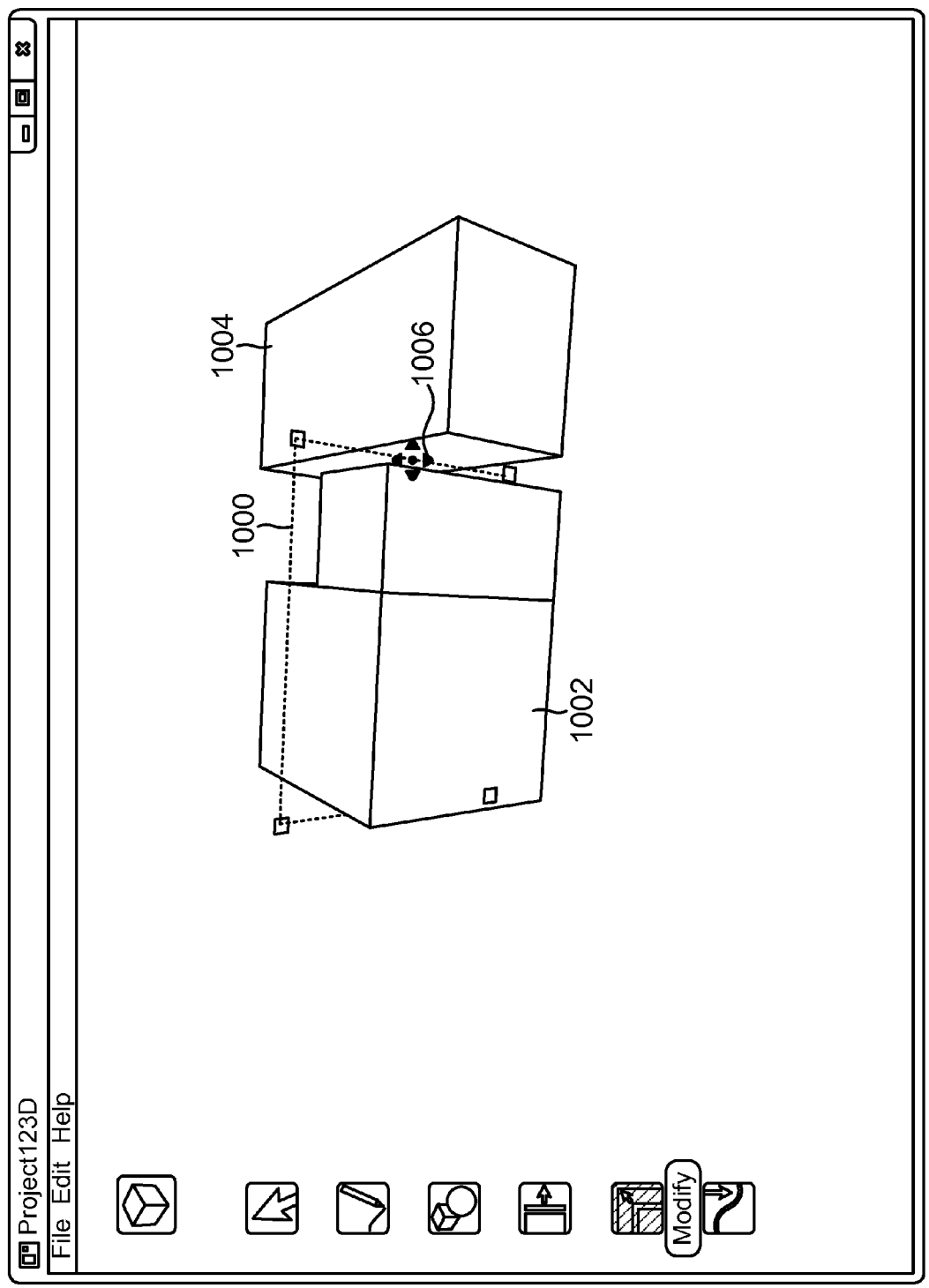

The manipulator 1000 moves with the object 1002. As illustrated in FIG. 10B, at a certain point during the translation/move operation, the manipulator 1000 bounding box/plane "touches" the bounding box of the other object 1004. Embodiments of the invention detect the "touching" and move the controlling object 1002 to the right side of the manipulator 1000 plane.

Figure 10C:
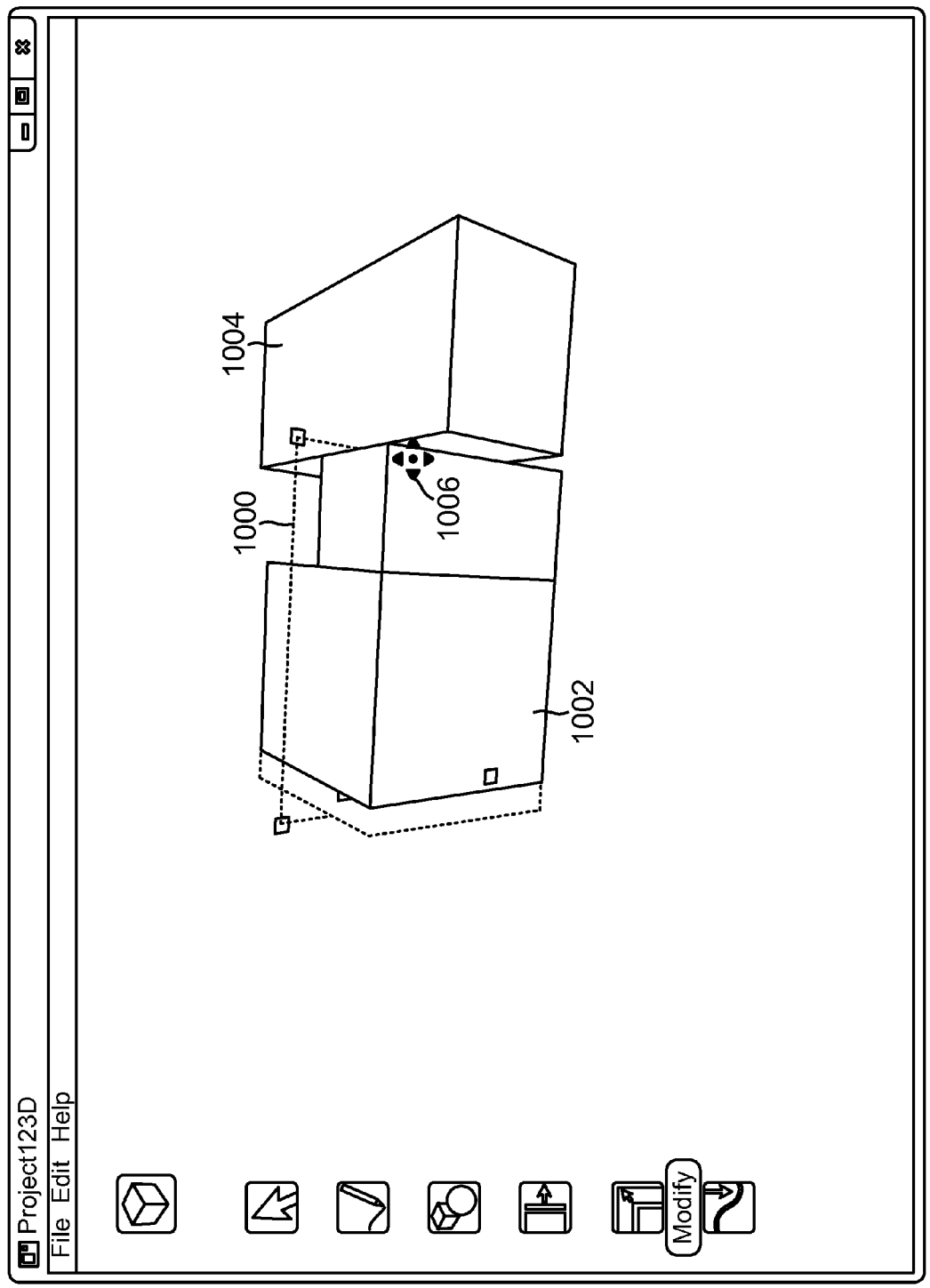

FIG. 10C illustrates the movement of the object 1002 within the manipulator 1000 plane so that the object 1002 is adjacent to the edge of the manipulator 1000 plane. Notice that the user cursor 1006 has not changed position (between FIGS. 10B and 10C) and that only the controlled object 1002 has moved. The size of the manipulator 1000 plane has not changed either. Only the controlled object 1002 is moved to the right side of the manipulation/manipulator 1000 plane. In other words, once the manipulator 1000 plane "touches" the bounding box of the second object 1004, the first object 1002 "snaps" or moves (without further movement of the cursor 1006) within the manipulator 1000 plane towards the plane where the "touching" has occurred.

Figure 10D:
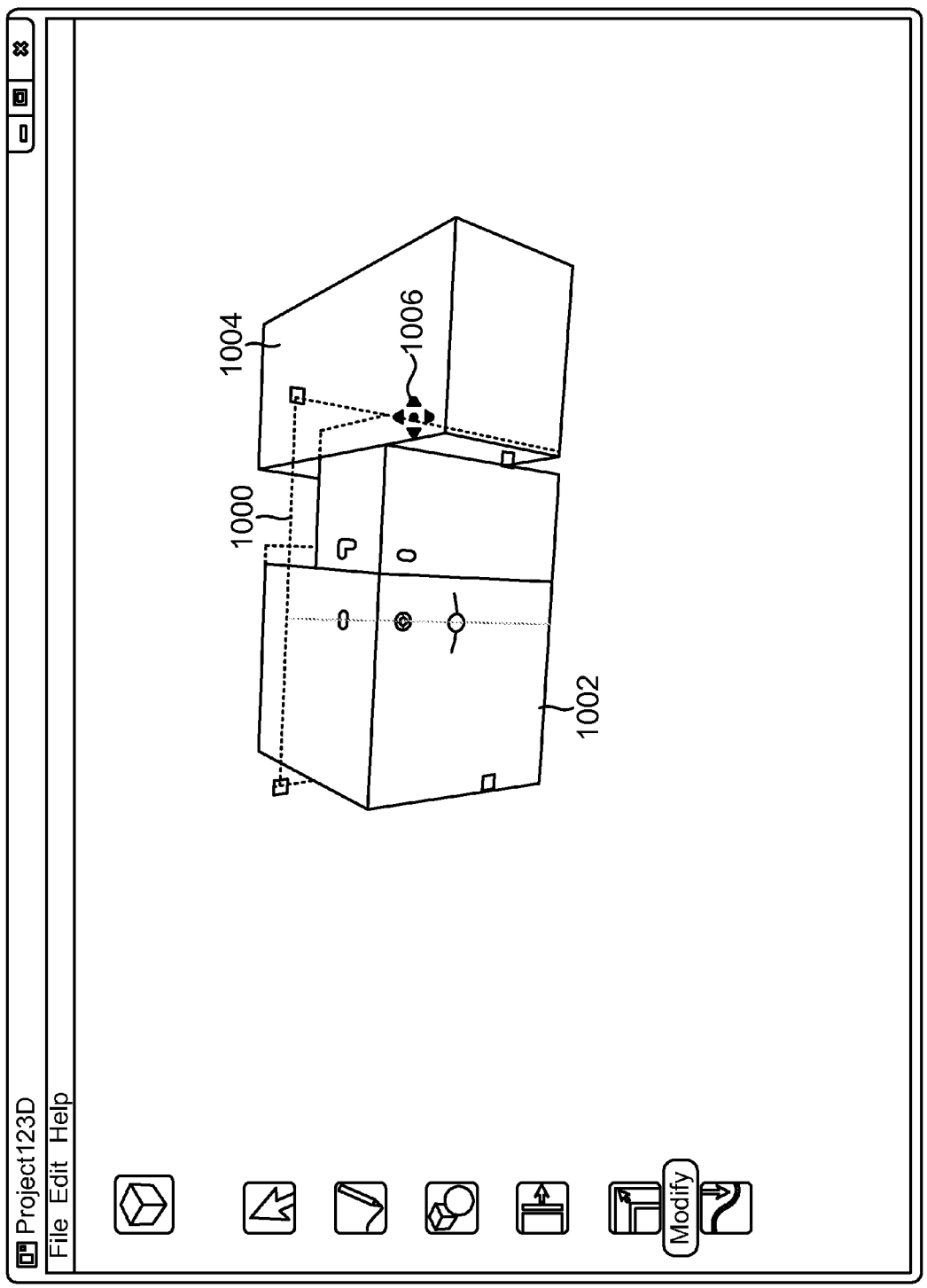

FIG. 10D illustrates a continued movement of the cursor during a translation operation. The user continues the translation operation, but only the manipulator 1000 plane continues to move. The controlled object 1002 is still matted to the bounding box of the detected object 1004. As illustrated, the cursor 1006 moves with the manipulator 1000 plane while the object 1002 remains locked/mated/matted to object 1004.

Figure 10E:
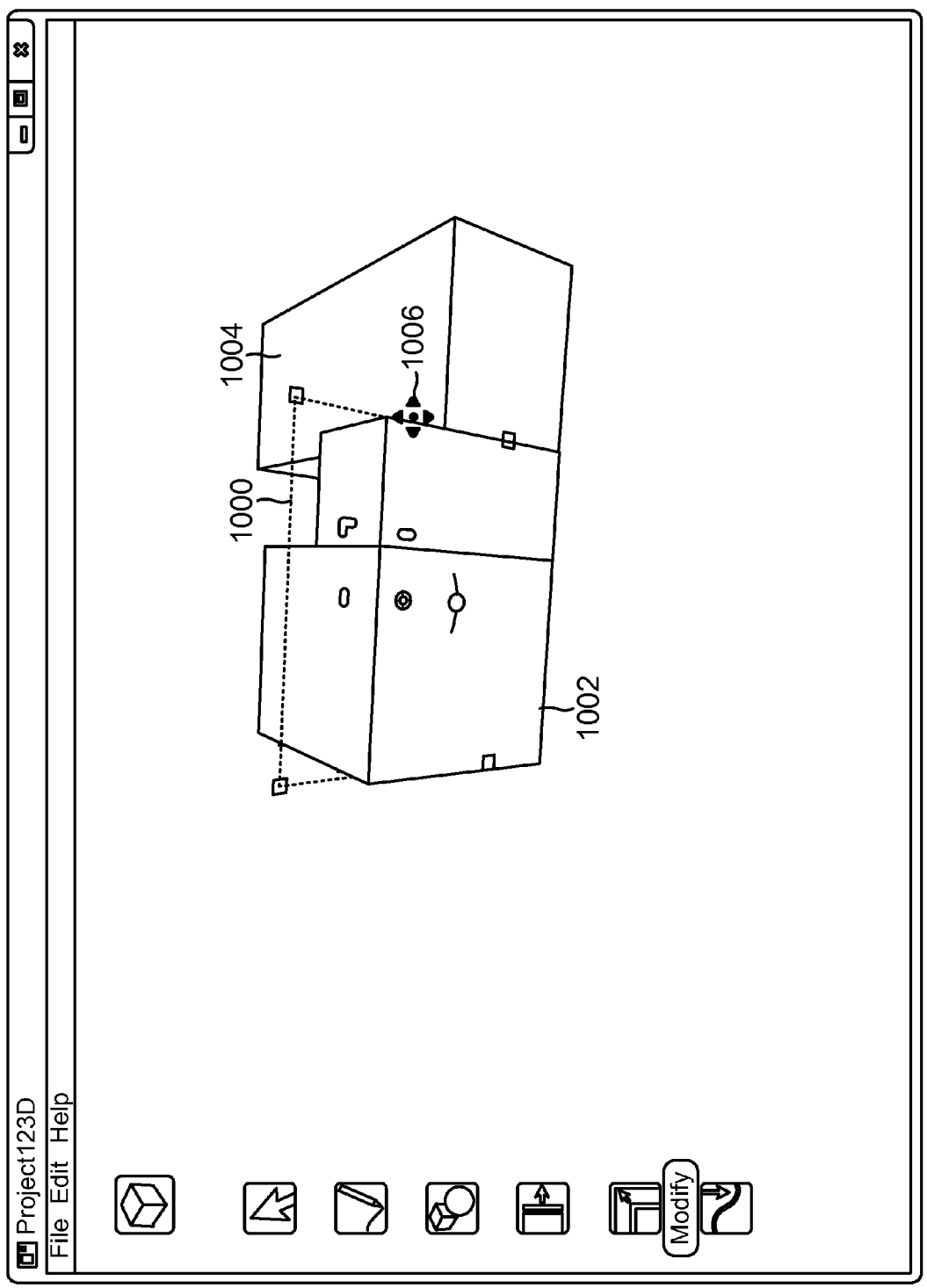

When the left plane of the manipulator 1000 reaches the left side of the controlled object 1002, the system releases the matting and moves back the controlled object 1002 to the center of the manipulator 1000 plane. As illustrated in FIG. 10E, the object 1002 has moved and is recentered within the manipulator 1000 plane. Thereafter, the translation operation can continue with the object 1002 not matted to the previously detected bounding box of object 1004.

Thus, FIGS. 10A-10E illustrate a translation operation using a manipulator 1000 plane in accordance with one or more embodiments of the invention. The manipulator 1000 plane controls an object as the user moves a cursor 1006 to perform the translation operation. Once the manipulator 1000 plane "touches" (e.g., is within a threshold distance from) a bounding box for a second object 1004, the controlled object 1002 automatically (i.e., without additional user input) snaps or moves (within the manipulator 1000 plane) adjacent to the detected bounding box for object 1004. As the translation operation continues, the controlled object 1002 remains matted to the detected bounding box of object 1004 while the manipulator 1000 plane continues to move. Once the far edge of the manipulator 1000 plane moves within a threshold distance of the edge of object 1002, object 1002 is unmated (i.e., from object 1004) and resets/moves to the center of manipulator 1000 plane. The manipulator 1000 plane can then continue moving with the object 1002.

Logical Flow

Figure 11:
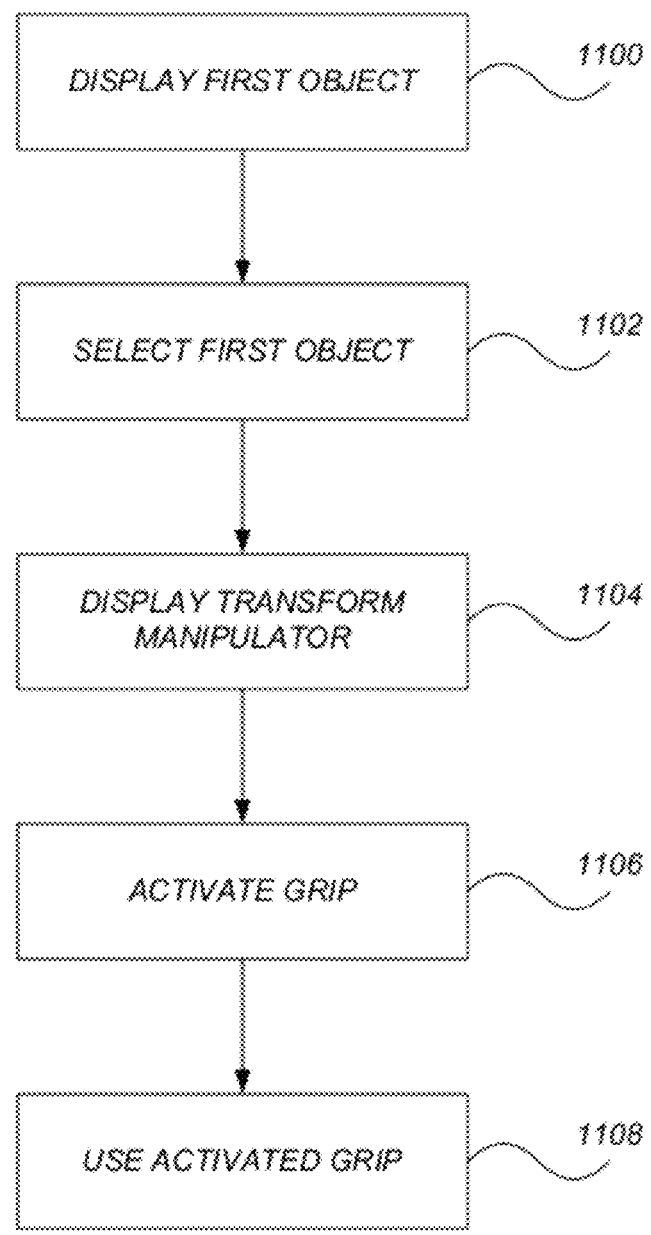
FIG. 11 is a flow chart illustrating the logical flow for manipulating an object in a 3D modeling system in accordance with one or more embodiments of the invention.

FIG. 11 is a flow chart illustrating the logical flow for manipulating an object in a 3D modeling system in accordance with one or more embodiments of the invention.

At step 1100, a first object is displayed, on a display device (e.g., a computer monitor), in the 3D modeling system.

At step 1102, the first object is selected. Such selection may be performed using a cursor control device to select a planar face, vertex, or edge of the first object.

At step 1104, in response to the selecting, a transform manipulator is displayed coincident with the first object. The transform manipulator includes a 2D control plane object and one or more grips located on the 2D control plane object. Such grips may be spread out around the 2D control plane object. The grips may include different categories of grips that may/may not be simultaneously displayed including pivot based grips and object-based transform grips. In this regarded, the grips displayed on the 2D control plane object may include one or more of the following:

(a) a first non-proportional scale grip, that is bounding box based, for scaling the first object in two axes;

(b) a second non-proportional scale based grip, that is bounding box based, for scaling the first object in one axis;

(c) a proportional scale based grip, that is pivot based, for scaling the first object;

(d) a third non-proportional scale based grip, that is pivot based, for scaling the first object in one axis;

(e) a move grip, for translating the first object;

(f) a pivot point grip; and (g) a rotation grip, that is pivot based, for rotating the first object.

Displaying the transform manipulator can be based on what makes the most sense from the viewing perspective. Thus, a viewpoint of the first object in the modeling system is determined. Based on the viewpoint, a currently active control plane is determined/computed. The 2D control lane object is then displayed on the currently active control plane. However, if a planar face of the first object is selected, the 2D control plane object may be displayed on the same plane as that of the planar face. Further, if a vertex of the first object is selected, rather than displaying multiple grips, only single move grip (and no additional grips) may be displayed on the 2D control plane object.

At step 1106, one of the one or more grips is activated (e.g., by selecting the grip, hovering over the grip, etc.).

At step 1108, the activated grip is used to manipulate the first object. The activating of the grip may be used to perform specific types of unique operations (e.g., a translation/move operation where two objects may be mated/snap to each other). During a translation/move operation, the first object may be centered within the 2D control plane object. As the move grip is moved/translated, the 2D control plane object is moved/translated. During such a translation of the control plane object, the first object is also moved while remaining centered in the 2D control plane object. When an edge of the 2D control plane object is within a first threshold distance (e.g., when it "touches" a bounding box) of a second object, the first object is translated within the 2D control plane object such that an edge of the first object is aligned with and mated to an edge of the second object (or a bounding box of the second object). Further translation of the 2D control plane object can continue but while mated, the first object does not move (i.e., only the 2D control plane object continues to move). Such a translation/movement of the 2D control plane object continues until a second edge of the control plane object is within a threshold distance of the opposite edge of the first object. When such a threshold distance has been reached, the first object is unmated from the second object edge/bounding box, and resets such that the first object moves and is once again centered within the control plane object.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

In summary, embodiments of the invention provide the ability to manipulate/edit an object in a 3D modeling application using a unique transformation manipulator. Aspects/properties of the transformation manipulator may include one or more of the following:

1. The transform manipulator paradigm is strongly based on graphic manipulation interactions;
2. The transform manipulator functionality is not clustered around a single point but rather spread out around the object and is more discoverable;
3. The transform manipulator is a 2D graphic as opposed to 3D geometry allowing for more interesting graphic approaches and exploration in visual graphic language;
4. The transform manipulator uses both pivot based as well as object based transforms;
5. All functionality is present in a single manipulator;
6. The transform manipulator implements an axial inferencing engine that is not explicit: the user does not need to pick directly on an affordance to move along an axis;
7. The transform manipulator implements a matting system that assists the user with positioning an object in relation to other existing objects;
8. The transform manipulator transforms the manipulation language for ease and efficient use by users; and
9. The transform manipulator provides interaction models so that the manipulator can be used to create geometry, perform transforms (that can be mapped to extrusion operations), and perform rotation operations (that can be mapped to revolve operations).

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for manipulating an object in a three-dimensional (3D) modeling system, comprising:
   (a) displaying, on a display device communicatively coupled to a computer, a first object in the 3D modeling system;
   (b) selecting the first object in the 3D modeling system;
   (c) in response to the selecting, displaying, coincident with the first object, a transform manipulator, wherein the transform manipulator comprises:
      (i) a two-dimensional (2D) control plane object; and
      (ii) one or more grips located on the 2D control plane object;
      wherein:
         multiple different types of manipulation functionality to manipulate the first object, as represented by the one or more grips, are spread out around the 2D control plane object;
         the transform manipulator is constrained to a 2D control plane; and
         a display of the transform manipulator is constructed of a bounding box of the first object plus buffer space and the one or more grips;
   (d) activating one of the one or more grips; and
   (e) using the activated grip to manipulate the first object.

2. The computer-implemented method of claim 1, wherein the displaying of the transform manipulator comprises:
   determining a viewpoint of the first object in the 3D modeling system;
   based on the viewpoint, determining a currently active control plane as the 2D control plane; and
   displaying the 2D control plane object on the currently active control plane.

3. The computer-implemented method of claim 1, wherein:
   the selecting of the first object comprises selecting a planar face of the first object; and
   the displaying of the transform manipulator comprises displaying the 2D control plane object in a same plane as the planar face.

4. The computer-implemented method of claim 1, wherein:
   the selecting of the first object comprises selecting a vertex of the first object; and
   the transform manipulator comprises a single move grip that is displayed on the 2D control plane object.

5. The computer-implemented method of claim 1, wherein the one or more grips are spread out around the 2D control plane object.

6. The computer-implemented method of claim 1, wherein the transform manipulator comprises:
   a pivot based grip; and
   an object-based transform grip.

7. The computer-implemented method of claim 1, wherein the transform manipulator comprises:
   a first non-proportional scale grip, that is bounding box based, for scaling the first object in two axes;
   a second non-proportional scale based grip, that is bounding box based, for scaling the first object in one axis;
   a proportional scale based grip, that is pivot based, for scaling the first object;
   a third non-proportional scale based grip, that is pivot based, for scaling the first object in one axis;
   a move grip, for translating the first object;
   a pivot point grip; and
   a rotation grip, that is pivot based, for rotating the first object.

8. The computer-implemented method of claim 1, wherein:
   (a) the first object is centered within the 2D control plane object;
   (b) the activating activates a move grip for translating the first object; and
   (c) the using comprises:
      (i) moving the move grip, wherein such moving translates the 2D control plane object, with the first object remaining centered in the 2D control plane object during the translation, towards a second object;
      (ii) when a 2D control plane object edge is within a first threshold distance of the second object, translating the first object within the 2D control plane object such that a first object edge is aligned with and mated to a second object edge;
      (iii) further moving the move grip thereby translating the 2D control plane object while the first object does not move and remains mated to the second object edge, until a second edge of the control plane object is within a second threshold distance of a second edge of the first object; and
      (iv) when the second edge of the control plane object is within a second threshold distance of a second edge of the first object, unmating the first object edge from the second object edge and moving the first object such that the first object is centered within the control plane object.

9. An apparatus for manipulating an object in a three-dimensional (3D) modeling system in a computer system comprising:
   (a) a computer having a memory; and
   (b) an application executing on the computer, wherein the application is configured to:

(i) display, on a display device communicatively coupled to a computer, a first object in the 3D modeling system;
(ii) select the first object in the 3D modeling system;
(iii) in response to the select, display, coincident with the first object, a transform manipulator, wherein the transform manipulator comprises:
(1) a two-dimensional (2D) control plane object; and
(2) one or more grips located on the 2D control plane object;
wherein:
multiple different types of manipulation functionality to manipulate the first object, as represented by the one or more grips, are spread out around the 2D control plane object;
the transform manipulator is constrained to a 2D control plane; and
a display of the transform manipulator is constructed of a bounding box of the first object plus buffer space and the one or more grips;
(iv) activate one of the one or more grips; and
(v) use the activated grip to manipulate the first object.

10. The apparatus of claim 9, wherein the application is configured to display the transform manipulator by:
determining a viewpoint of the first object in the 3D modeling system;
based on the viewpoint, determining a currently active control plane as the 2D control plane; and
displaying the 2D control plane object on the currently active control plane.

11. The apparatus of claim 9, wherein:
the first object is selected by selecting a planar face of the first object; and
the transform manipulator is displayed by displaying the 2D control plane object in a same plane as the planar face.

12. The apparatus of claim 9, wherein:
the first object is selected by selecting a vertex of the first object; and
the transform manipulator comprises a single move grip that is displayed on the 2D control plane object.

13. The apparatus of claim 9, wherein the one or more grips are spread out around the 2D control plane object.

14. The apparatus of claim 9, wherein the transform manipulator comprises:
a pivot based grip; and
an object-based transform grip.

15. The apparatus of claim 9, wherein the transform manipulator comprises:
a first non-proportional scale grip, that is bounding box based, for scaling the first object in two axes;
a second non-proportional scale based grip, that is bounding box based, for scaling the first object in one axis;
a proportional scale based grip, that is pivot based, for scaling the first object;
a third non-proportional scale based grip, that is pivot based, for scaling the first object in one axis;
a move grip, for translating the first object;
a pivot point grip; and
a rotation grip, that is pivot based, for rotating the first object.

16. The apparatus of claim 9, wherein:
(a) the first object is centered within the 2D control plane object;
(b) the activating activates a move grip for translating the first object; and
(c) the activated move grip is used by:

(i) moving the move grip, wherein such moving translates the 2D control plane object, with the first object remaining centered in the 2D control plane object during the translation, towards a second object;
(ii) when a 2D control plane object edge is within a first threshold distance of the second object, translating the first object within the 2D control plane object such that a first object edge is aligned with and mated to a second object edge;
(iii) further moving the move grip thereby translating the 2D control plane object while the first object does not move and remains mated to the second object edge, until a second edge of the control plane object is within a second threshold distance of a second edge of the first object; and
(iv) when the second edge of the control plane object is within a second threshold distance of a second edge of the first object, unmating the first object edge from the second object edge and moving the first object such that the first object is centered within the control plane object.

17. A non-transitory computer readable storage medium encoded with computer program instructions which when accessed by a computer cause the computer to load the program instructions to a memory therein creating a special purpose data structure causing the computer to operate as a specially programmed computer, executing a method of manipulating an object in a three-dimensional (3D) modeling system, comprising:
(a) displaying, on a display device communicatively coupled to the specially programmed computer, a first object in the 3D modeling system;
(b) selecting, in the specially programmed computer, the first object in the 3D modeling system;
(c) in response to the selecting, displaying, in the specially programmed computer, coincident with the first object, a transform manipulator, wherein the transform manipulator comprises:
(i) a two-dimensional (2D) control plane object; and
(ii) one or more grips located on the 2D control plane object;
wherein:
multiple different types of manipulation functionality to manipulate the first object, as represented by the one or more grips, are spread out around the 2D control plane object;
the transform manipulator is constrained to a 2D control plane; and
a display of the transform manipulator is constructed of a bounding box of the first object plus buffer space and the one or more grips;
(d) activating, in the specially programmed computer, one of the one or more grips; and
(e) using, in the specially programmed computer, the activated grip to manipulate the first object.

18. The non-transitory computer readable storage medium of claim 17, wherein the displaying of the transform manipulator comprises:
determining, in the specially programmed computer, a viewpoint of the first object in the 3D modeling system;
based on the viewpoint, determining, in the specially programmed computer, a currently active control plane as the 2D control plane; and
displaying, in the specially programmed computer, the 2D control plane object on the currently active control plane.

19. The non-transitory computer readable storage medium of claim 17, wherein:
- the selecting of the first object comprises selecting, in the specially programmed computer, a planar face of the first object; and
- the displaying of the transform manipulator comprises displaying, in the specially programmed computer, the 2D control plane object in a same plane as the planar face.

20. The non-transitory computer readable storage medium of claim 17, wherein:
- the selecting of the first object comprises selecting, in the specially programmed computer, a vertex of the first object; and
- the transform manipulator comprises a single move grip that is displayed on the 2D control plane object.

21. The non-transitory computer readable storage medium of claim 17, wherein the one or more grips are spread out around the 2D control plane object.

22. The non-transitory computer readable storage medium of claim 17, wherein the transform manipulator comprises:
- a pivot based grip; and
- an object-based transform grip.

23. The non-transitory computer readable storage medium of claim 17, wherein the transform manipulator comprises:
- a first non-proportional scale grip, that is bounding box based, for scaling the first object in two axes;
- a second non-proportional scale based grip, that is bounding box based, for scaling the first object in one axis;
- a proportional scale based grip, that is pivot based, for scaling the first object;
- a third non-proportional scale based grip, that is pivot based, for scaling the first object in one axis;
- a move grip, for translating the first object;
- a pivot point grip; and
- a rotation grip, that is pivot based, for rotating the first object.

24. The non-transitory computer readable storage medium of claim 17, wherein:
- (a) the first object is centered within the 2D control plane object;
- (b) the activating activates a move grip for translating the first object,
- (c) the using comprises:
  - (i) moving the move grip, wherein such moving translates the 2D control plane object, with the first object remaining centered in the 2D control plane object during the translation, towards a second object;
  - (ii) when an 2D control plane object edge is within a first threshold distance of the second object, translating the first object within the 2D control plane object such that a first object edge is aligned with and mated to a second object edge;
  - (iii) further moving the move grip thereby translating the 2D control plane object while the first object does not move and remains mated to the second object edge, until a second edge of the control plane object is within a second threshold distance of a second edge of the first object; and
  - (iv) when the second edge of the control plane object is within a second threshold distance of a second edge of the first object, unmating the first object edge from the second object edge and moving the first object such that the first object is centered within the control plane object.

* * * * *